United States Patent
Tsujikawa et al.

(10) Patent No.: US 9,972,336 B2
(45) Date of Patent: May 15, 2018

(54) SPEECH INPUT APPARATUS, SPEECH PROCESSING METHOD, SPEECH PROCESSING PROGRAM, CEILING MEMBER, AND VEHICLE

(71) Applicant: NEC Corporation, Minato-ku, Tokyo (JP)

(72) Inventors: Masanori Tsujikawa, Tokyo (JP); Ken Hanazawa, Tokyo (JP); Akihiko Sugiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 5 days.

(21) Appl. No.: 14/766,810

(22) PCT Filed: Sep. 9, 2013

(86) PCT No.: PCT/JP2013/074193
§ 371 (c)(1),
(2) Date: Aug. 10, 2015

(87) PCT Pub. No.: WO2014/125669
PCT Pub. Date: Aug. 21, 2014

(65) Prior Publication Data
US 2015/0380011 A1    Dec. 31, 2015

(30) Foreign Application Priority Data
Feb. 12, 2013    (JP) ................................. 2013-025000

(51) Int. Cl.
*G10L 21/0208*    (2013.01)
*G10L 21/0216*    (2013.01)
(Continued)

(52) U.S. Cl.
CPC ...... *G10L 21/0208* (2013.01); *B60R 11/0247* (2013.01); *G10L 21/0216* (2013.01);
(Continued)

(58) Field of Classification Search
CPC ............. G10L 21/0208; G10L 21/0216; G10L 21/0272; G10L 21/0205;
(Continued)

(56) References Cited

U.S. PATENT DOCUMENTS 6,614,911 B1    9/2003    Watson et al.
7,103,460 B1 *   9/2006    Breed ................. B60C 23/0408
                                                             701/29.1
(Continued)

FOREIGN PATENT DOCUMENTS

JP    H07-176178 A   *   7/1995
JP    2003-515281 A      4/2003
(Continued)

OTHER PUBLICATIONS

International Search Report for PCT Application No. PCT/JP2013/074193, dated Dec. 10, 2013.
(Continued)

*Primary Examiner* — Duc Nguyen
*Assistant Examiner* — Yogeshkumar Patel

(57) ABSTRACT

An apparatus of this invention is directed to a speech input apparatus for obtaining a piece of high-quality speech with included noise reduced. The speech input apparatus includes a sound insulating block attached to a ceiling member in a vehicle, a first microphone that is attached to a side surface of the sound insulating block or the ceiling member in the vicinity of the sound insulating block on a side close to a passenger of the vehicle, inputs a sound mixture including the voice of the passenger and noise in the vehicle, and outputs a first signal to a noise suppressor configured to output an enhanced speech signal, and a second microphone that is attached to a side surface of the sound insulating block or the ceiling member in the vicinity of the sound insulating block on a side far from the passenger, inputs the noise in the vehicle, and outputs a second signal to the noise suppressor.

16 Claims, 24 Drawing Sheets

(51) Int. Cl.
  *B60R 11/02* (2006.01)
  *H04R 3/00* (2006.01)
  *H04R 1/08* (2006.01)
  *B60R 11/00* (2006.01)
  *H04R 1/40* (2006.01)
(52) U.S. Cl.
  CPC ............... *H04R 1/08* (2013.01); *H04R 3/005* (2013.01); *B60R 2011/0028* (2013.01); *G10L 2021/02165* (2013.01); *H04R 1/406* (2013.01); *H04R 2410/03* (2013.01); *H04R 2499/13* (2013.01)
(58) Field of Classification Search
  CPC ... G10L 2021/02165; B60R 2011/0028; B60R 2011/0033; B60R 11/0247; B60R 11/02; H04R 1/08; H04R 3/005; H04R 1/406; H04R 2410/03; H04R 2499/12
  USPC ..................... 704/226, 233; 381/92; 348/148
  See application file for complete search history.

(56) References Cited

U.S. PATENT DOCUMENTS

| | | | |
|---|---|---|---|
| 7,120,261 B1 | 10/2006 | Turnbull et al. | |
| 7,146,013 B1* | 12/2006 | Saito | H04R 3/005 381/92 |
| 2002/0024713 A1 | 2/2002 | Turnbull et al. | |
| 2002/0032510 A1 | 3/2002 | Turnbull et al. | |
| 2004/0028239 A1 | 2/2004 | Watson et al. | |
| 2004/0133426 A1* | 7/2004 | Kimura | B60R 16/0373 704/272 |
| 2004/0170293 A1 | 9/2004 | Watson et al. | |
| 2006/0097855 A1 | 5/2006 | Turnbull et al. | |
| 2007/0047753 A1 | 3/2007 | Watson et al. | |
| 2007/0133827 A1 | 6/2007 | Turnbull et al. | |
| 2007/0291383 A1 | 12/2007 | Watson et al. | |
| 2008/0103655 A1 | 5/2008 | Turnbull et al. | |
| 2009/0097674 A1 | 4/2009 | Watson et al. | |
| 2013/0311175 A1* | 11/2013 | Arakawa | H04R 3/005 704/226 |

FOREIGN PATENT DOCUMENTS

| | | |
|---|---|---|
| WO | 2001/037519 A2 | 5/2001 |
| WO | 2001/080353 A1 | 10/2001 |
| WO | 2009/051132 A1 | 4/2009 |
| WO | 2012/096072 A1 | 7/2012 |
| WO | WO 2012/096072 A1 * | 7/2012 |
| WO | 2012/165657 A1 | 12/2012 |

OTHER PUBLICATIONS

Japanese Office Action for JP Application No. 2015-500089 dated Jun. 29, 2017 with English Translation.

* cited by examiner

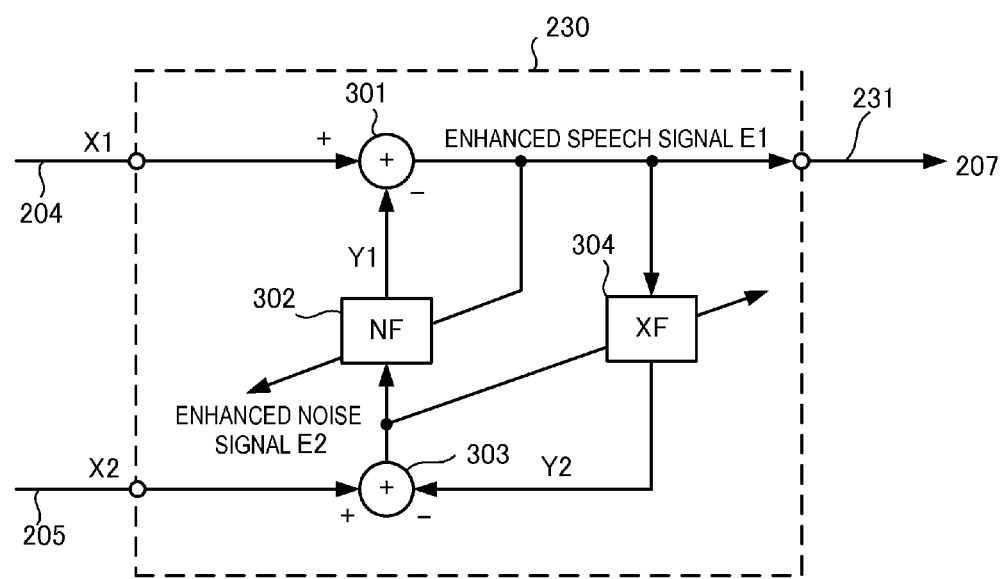
F I G. 3

| FIG. 5A / FIG. 5B | 511 | 512 | 513 | 514 | 515 | 516 | ... |
|---|---|---|---|---|---|---|---|
| 521 | RECTANGULAR PARALLELEPIPED SHAPE | TRIANGULAR PRISM | TRIANGULAR PRISM (RECESS) | TRIANGULAR PRISM | CYLINDRICAL SHAPE | | |
| 522 | DOME SHAPE | HEMICONICAL SHAPE (VERTICAL-CUT CONE) | HEMICONE (RECESS) | HEMICONICAL SHAPE (VERTICAL-CUT CONE) | CUP SHAPE | | |
| 523 | DIAGONAL-CUT PRISM SHAPE | QUADRANGULAR PYRAMID SHAPE | QUADRANGULAR PYRAMID (RECESS) | QUADRANGULAR PYRAMID SHAPE | DIAGONAL-CUT CYLINDRICAL SHAPE | | |
| 524 | DIAGONAL-CUT PRISM SHAPE | QUADRANGULAR PYRAMID SHAPE | QUADRANGULAR PYRAMID (RECESS) | QUADRANGULAR PYRAMID SHAPE | DIAGONAL-CUT CYLINDRICAL SHAPE | | |
| 525 | DIAGONAL-CUT PRISM SHAPE | QUADRANGULAR PYRAMID SHAPE | QUADRANGULAR PYRAMID (RECESS) | QUADRANGULAR PYRAMID SHAPE | DIAGONAL-CUT CYLINDRICAL SHAPE | | |
| 526 | TRIANGULAR PRISM SHAPE TRIANGULAR PYRAMID SHAPE | TRIANGULAR PYRAMID SHAPE | TRIANGULAR PYRAMID (RECESS) | TRIANGULAR PYRAMID SHAPE | CYLINDRICAL SHAPE | | |
| 527 | TRUNCATED QUADRANGULAR PYRAMID | TRUNCATED TRIANGULAR PYRAMID | TRUNCATED TRIANGULAR PYRAMID | TRUNCATED TRIANGULAR PYRAMID | TRUNCATED CYLINDRICAL PYRAMID | | |
| 528 | DIAGONAL-CUT PRISM SHAPE (RECESS) | QUADRANGULAR PYRAMID (RECESS) | QUADRANGULAR PYRAMID (RECESS) | QUADRANGULAR PYRAMID (RECESS) | DIAGONAL-CUT CYLINDER (RECESS) | | |
| ... | | | | | | | |

F I G. 6

| VEHICLE SPEED > α | AIR CONDITIONER NOISE > β | WINDSHIELD WIPER OPERATION | ... | DETERMINATION RESULT (EXTRACT/STORE) |
|---|---|---|---|---|
| ○ | – – | – – | | EXTRACT |
| – – | ○ | – – | | EXTRACT |
| ... | | | | |
| × | × | × | | STORE |

F I G. 10

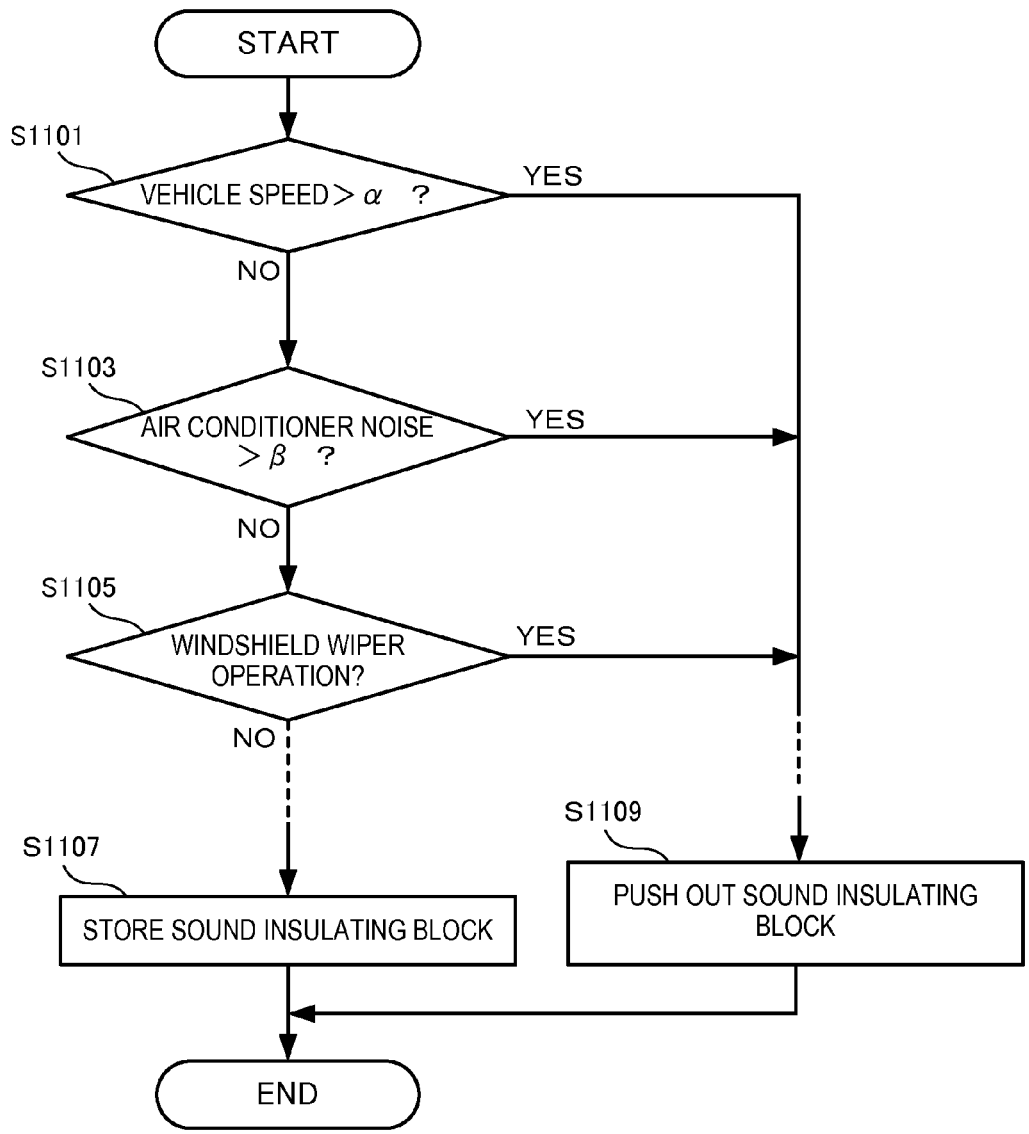
F I G. 11

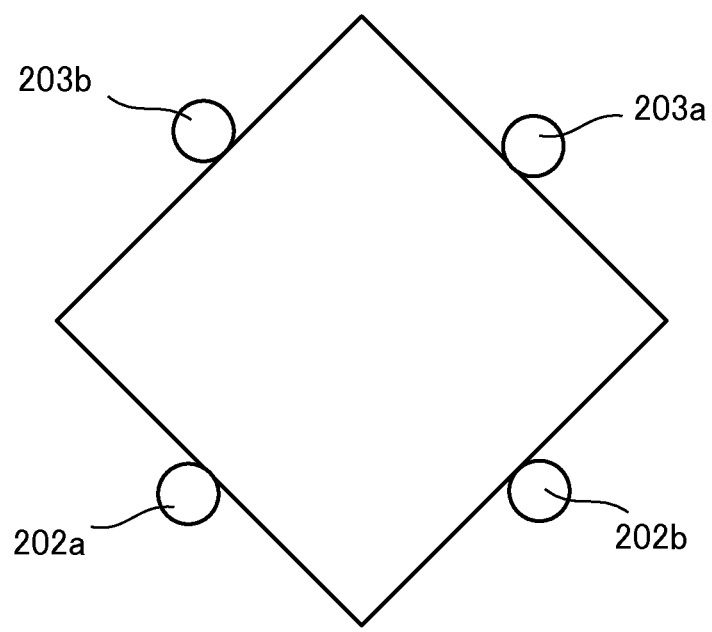
F I G. 12B

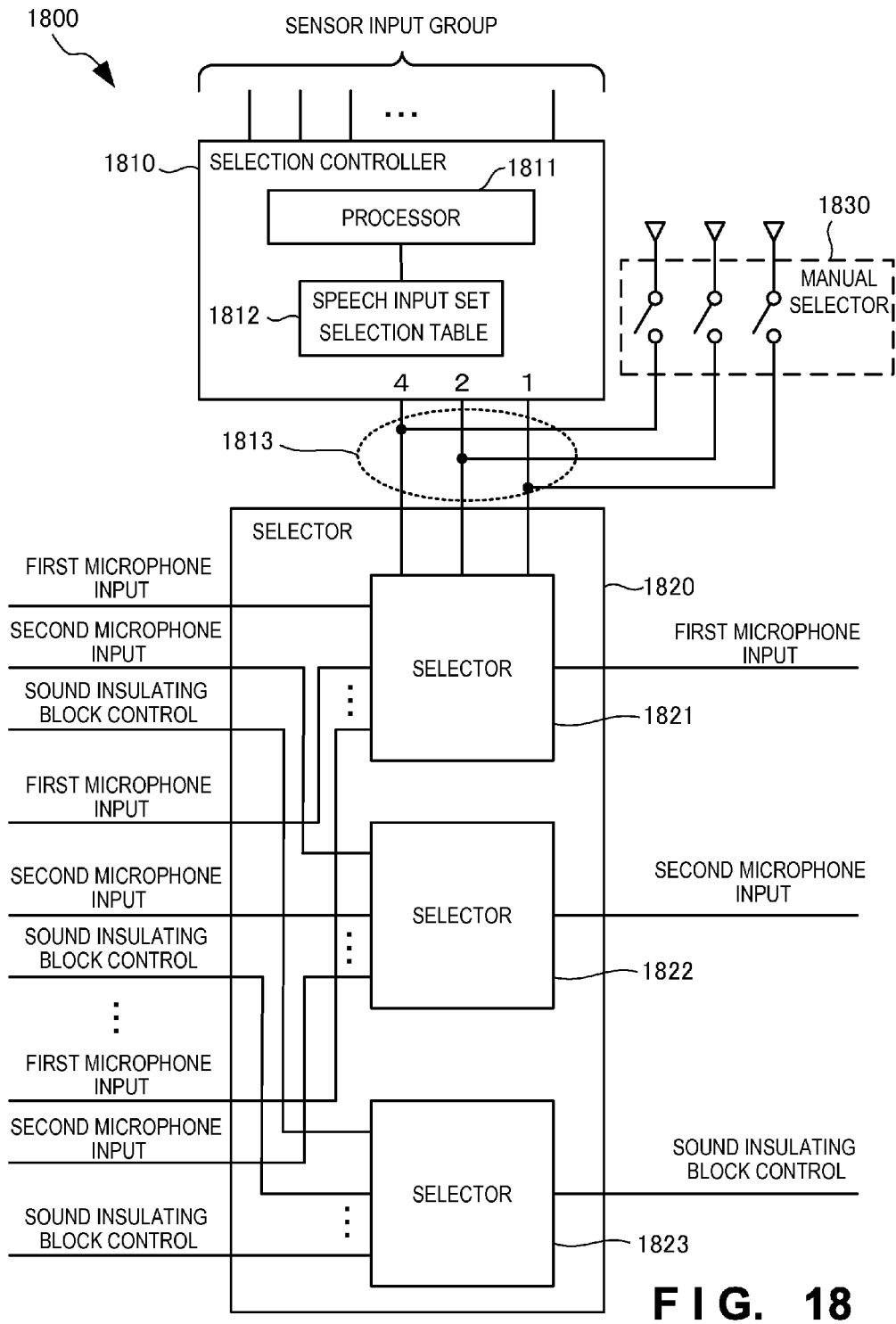
F I G. 18

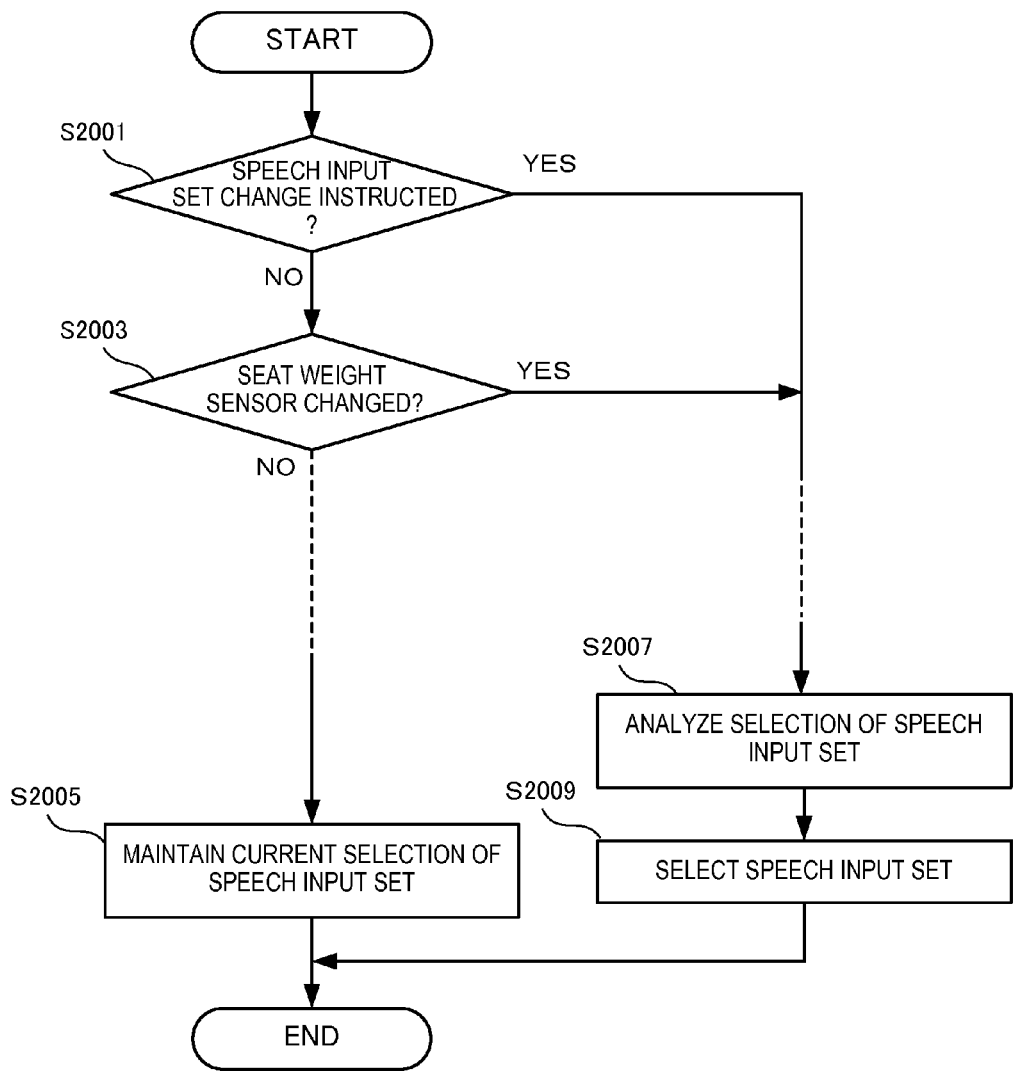
F I G. 20

SPEECH INPUT APPARATUS, SPEECH PROCESSING METHOD, SPEECH PROCESSING PROGRAM, CEILING MEMBER, AND VEHICLE

This application is a National Stage Entry of PCT/JP2013/074193 filed on Sep. 9, 2013, which claims priority from Japanese Patent Application 2013-025000 filed on Feb. 12, 2013, the contents of all of which are incorporated herein by reference, in their entirety.

TECHNICAL FIELD

The present invention relates to a technique of suppressing noise from a sound mixture including the noise and a desired signal.

BACKGROUND ART

In the above technical field, patent literature 1 discloses a technique of providing a sound insulator having a "V-shaped" or "L-shaped" section to do sound insulation between a first microphone configured to mainly input the piece of speech of a speaker and a second microphone configured to mainly input noise.

CITATION LIST

Patent Literature

Patent literature 1: International Publication No. 2012/096072

SUMMARY OF THE INVENTION

Technical Problem

In the technique described in the above literature, however, the sound insulation state changes depending on the direction of the speech source or noise source, and in particular, the relationship between noise input to the first microphone and that input to the second microphone changes. It is therefore impossible to obtain a desired signal of high quality independently of the direction of the desired signal or noise.

The present invention enables to provide a technique of solving the above-described problem.

Solution to Problem

One aspect of the present invention provides a speech input apparatus comprising:
  a sound insulating block attached to a ceiling member in a vehicle;
  a first microphone that is attached to one of a side surface of the sound insulating block and the ceiling member in a vicinity of the sound insulating block on a side close to a passenger of the vehicle, inputs a sound mixture including a voice of the passenger and noise in the vehicle and outputs a first signal to a noise suppressor; and
  a second microphone that is attached to one of a side surface of the sound insulating block and the ceiling member in the vicinity of the sound insulating block on a side far from the passenger, inputs the noise in the vehicle and outputs a second signal to the noise suppressor.

Another aspect of the present invention provides a speech processing method comprising:
  by a first microphone that is provided on one of a side surface of a sound insulating block attached to a ceiling member in a vehicle and the ceiling member in a vicinity of the sound insulating block on a side close to a passenger of the vehicle, inputting a sound mixture including a voice of the passenger and noise in the vehicle and outputting a first signal to a noise suppressor; and
  by a second microphone that is provided on one of a side surface of the sound insulating block attached to the ceiling member in the vehicle and the ceiling member in the vicinity of the sound insulating block on a side far from the passenger, inputting the noise in the vehicle and outputting a second signal to the noise suppressor; and
  by the noise suppressor, suppressing the noise based on the first signal and the second signal and outputting an enhanced speech signal.

Still other aspect of the present invention provides a speech processing program for causing a computer to execute a method comprising:
  causing a first microphone that is provided on one of a side surface of a sound insulating block attached to a ceiling member in a vehicle and the ceiling member in a vicinity of the sound insulating block on a side close to a passenger of the vehicle, to input a sound mixture including a voice of the passenger and noise in the vehicle and output a first signal to a noise suppressor; and
  causing a second microphone that is provided on one of a side surface of the sound insulating block attached to the ceiling member in the vehicle and the ceiling member in the vicinity of the sound insulating block on a side far from the passenger, to input the noise in the vehicle and output a second signal to the noise suppressor; and
  causing the noise suppressor to suppress the noise based on the first signal and the second signal and output an enhanced speech signal.

Still other aspect of the present invention provides a ceiling member comprising the above mentioned speech input apparatus.

Still other aspect of the present invention provides a vehicle comprising the above mentioned speech input apparatus.

Advantageous Effects of Invention

According to the present invention, it is possible to obtain a high-quality desired signal with included noise reduced.

BRIEF DESCRIPTION OF THE DRAWINGS

FIG. 3 is a block diagram showing the arrangement of a noise suppression circuit according to the second embodiment of the present invention;

FIG. 6 is a view showing the combinations of planar shapes and sectional shapes and the three-dimensional shapes of the sound insulating block according to the second embodiment of the present invention;

FIG. 10 is a view showing the arrangement of a retract determination table according to the fourth embodiment of the present invention;

FIG. 11 is a flowchart showing the procedure of retract processing for the sound insulating block according to the fourth embodiment of the present invention;

FIG. 12B is a view for explaining the speech input apparatus according to the fifth embodiment of the present invention;

FIG. 18 is a block diagram showing the arrangement of a speech input set selector according to the seventh embodiment of the present invention;

FIG. 20 is a flowchart showing the procedure of speech input set selection processing according to the seventh embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. For example, in the following embodiments, a first microphone and a second microphone are illustrated as if they were in contact with a sound insulating block. However, the first microphone and the second microphone may be located at positions far apart from the sound insulating block as long as desired signal input to the second microphone is insulated by the sound insulating block, and noise input to the first microphone and the second microphone is not insulated by the sound insulating block.

First Embodiment

A speech input apparatus 100 according to the first embodiment of the present invention will be described with reference to FIG. 1. The speech input apparatus 100 is an apparatus configured to output a high-quality signal to a noise suppressor to obtain noise and a piece of speech with included noise reduced.

Figure 1:
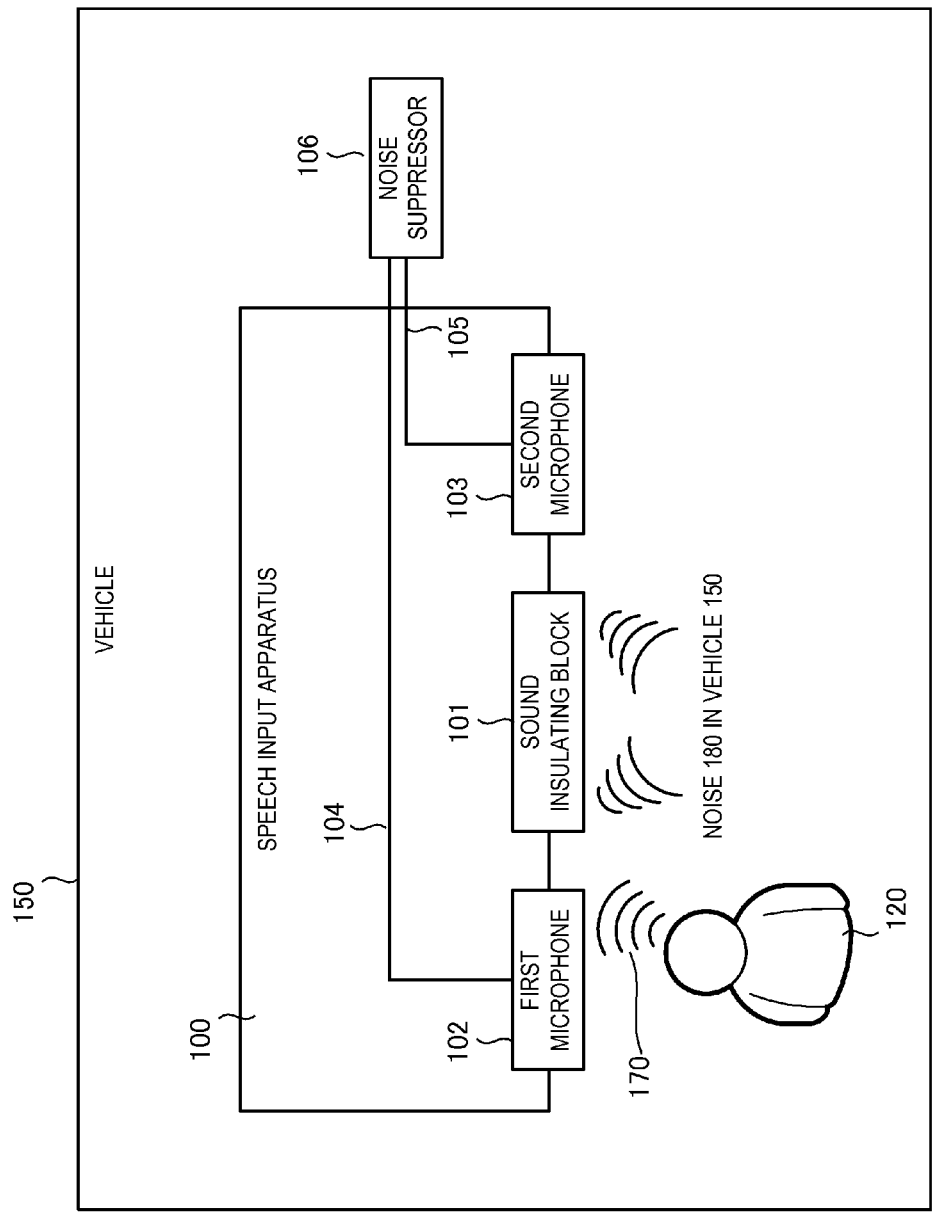
FIG. 1 is a block diagram showing the arrangement of a speech input apparatus according to the first embodiment of the present invention.

As shown in FIG. 1, the speech input apparatus 100 includes a sound insulating block 101, a first microphone 102, and a second microphone 103. The sound insulating block 101 is attached to a ceiling member in a vehicle 150. The first microphone 102 is attached to the ceiling member or a side surface of the sound insulating block 101 on a side closer to the passenger of the vehicle 150. The first microphone 102 inputs a sound mixture including a voice 170 of a passenger 120 and noise 180 in the vehicle 150 and outputs a first signal 104 to a noise suppressor 106. The second microphone 103 is attached to the ceiling member or a side surface of the sound insulating block 101 on a side farther from the passenger 120. The second microphone 103 inputs the noise 180 in the vehicle 150 and outputs a second signal 105 to the noise suppressor 106.

According to this embodiment, a piece of speech is input to the first microphone. Simultaneously, a piece of speech to the second microphone is insulated. In addition, noise coming from directions other than the pieces of speech is similarly input to the first microphone and the second microphone. For this reason, the noise suppressor can obtain a piece of high-quality speech with included noise reduced.

Second Embodiment

A speech input apparatus according to the second embodiment of the present invention will be described next. In the speech input apparatus according to this embodiment, a first microphone that mainly inputs a piece of speech is arranged on a side closer to a passenger, and a second microphone that inputs noise is arranged on a side farther from the passenger. The first microphone inputs a sound mixture including the piece of speech of the passenger and noise in the vehicle, and the second microphone inputs noise in the vehicle while insulating the piece of speech of the passenger by a sound insulating block. Signals representing the sound mixture of the first microphone and the noise of the second microphone are sent to a noise suppression circuit, and an enhanced signal with noise suppressed is generated.

According to this embodiment, since the sound insulating block insulates input of the piece of speech of the passenger to the second microphone but does not divide the space in the vehicle, there is no difference in noise input between the first microphone and the second microphone. It is therefore possible to obtain a piece of high-quality speech with included noise reduced from the first microphone and the second microphone.

<<Arrangement of Speech Processing System>>

Figure 2:
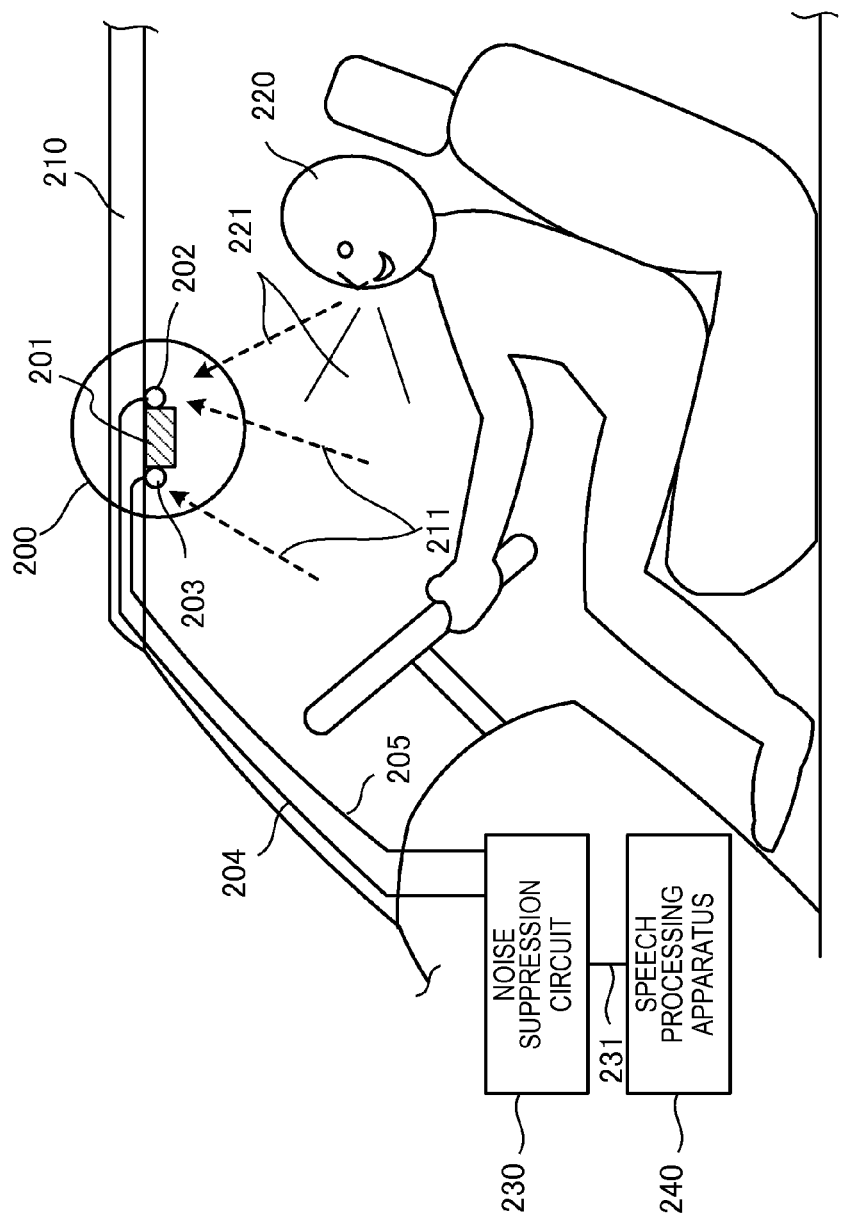
FIG. 2 is a block diagram showing the arrangement of a speech processing system including a speech input apparatus according to the second embodiment of the present invention.

FIG. 2 is a block diagram showing the arrangement of a speech processing system including a speech input apparatus 200 according to this embodiment. FIG. 2 illustrates the speech processing system of a vehicle in a case where the speech input apparatus 200 according to this embodiment is arranged at a position to input a piece of speech 221 uttered by a driver 220, that is, a predetermined position on a ceiling member 210 above the driver's seat in the vehicle. Note that in FIG. 2, the speech input apparatus 200 is placed above the driver's seat. However, the speech input apparatus 200 may be placed above the assistant driver's seat to input a piece of speech uttered by a passenger on the assistant driver's seat.

The speech input apparatus 200 according to this embodiment includes a sound insulating block 201, a first microphone 202, and a second microphone 203. The sound insulating block 201 insulates the piece of speech 221 uttered by the driver 220 so that the piece of speech is hardly input to the second microphone 203. On the other hand, the sound insulating block 201 has such a size and shape that enable to equally input noise 211 in the vehicle to the first microphone 202 and the second microphone 203 and is arranged at such a position. Hence, when the noise input to the second microphone 203 is removed from the sound mixture of the piece of speech 221 and the noise 211 input to the first microphone 202, the piece of speech 221 uttered by the driver 220 can be obtained.

However, the piece of speech 221 input to the second microphone 203 is not zero. In addition, the noise 211 input to the first microphone 202 and the noise 211 input to the second microphone 203 do not completely equal. For these reasons, a mixture signal 204 output from the first microphone 202 is input to an onboard noise suppression circuit 230 via a signal line. On the other hand, a noise signal 205 output from the second microphone 203 is input to the onboard noise suppression circuit 230 via a signal line. Based on the mixture signal 204 and the noise signal 205, the noise suppression circuit 230 outputs an enhanced speech signal 231 with noise suppressed. The enhanced speech signal 231 is input to a speech processing apparatus 240 and processed as the voice 221 of the driver 220. Processing of the speech processing apparatus 240 is not the characteristic point of this embodiment, and a detailed description thereof will be omitted.

As shown in FIG. 2, the sound insulating block 201 according to this embodiment insulates input of the piece of speech 221 uttered by the driver 220 to the second microphone 203 but does not insulate input of noise coming from various directions other than the driver 220 to the first microphone 202 without largely projecting from the ceiling member 210.

<<Arrangement of Noise Suppression Circuit>>

FIG. 3 is a block diagram showing the arrangement of the noise suppression circuit 230 according to this embodiment. Note that the signal from the second microphone 203 is illustrated as the noise signal 205 but actually is a mixture signal slightly including a speech signal as well.

The noise suppression circuit 230 includes a subtracter 301 that subtracts, from a mixture signal X1 (204), an estimated noise signal Y1 estimated to be included in the mixture signal 204. The noise suppression circuit 230 also includes a subtracter 303 that subtracts, from the noise signal 205, an estimated speech signal Y2 estimated to be included in a noise signal X2 (205). The noise suppression circuit 230 also includes an adaptive filter NF 302 serving as an estimated noise signal generator that generates the estimated noise signal Y1 from an enhanced noise signal E2 that is the output signal of the subtracter 303. The noise suppression circuit 230 also includes an adaptive filter XF 304 serving as an estimated speech signal generator that generates the estimated speech signal Y2 from an enhanced speech signal E1 (231) that is the output signal of the subtracter 301. A detailed example of the adaptive filter XF 304 is described in International Publication No. 2005/024787. Even if a piece of target speech is input to the second microphone 203 while going around the sound insulating block 201, and the speech signal is included in the noise signal 205, the adaptive filter XF 304 can prevent the subtracter 301 from erroneously removing the speech signal of the piece of speech that has gone around from the mixture signal 204.

With this arrangement, the subtracter 301 subtracts the estimated noise signal Y1 from the mixture signal X1 (204) transmitted from the first microphone 202 and outputs the enhanced speech signal E1 (231).

The adaptive filter 302 generates the estimated noise signal Y1 by processing the enhanced noise signal E2 using a parameter that changes based on the enhanced speech signal E1 (231). The enhanced noise signal E2 is a signal obtained by causing the subtracter 303 to subtract the estimated speech signal Y2 from the noise signal 205 transmitted from the second microphone 203 via a signal line.

The adaptive filter XF 304 generates the estimated speech signal Y2 by processing the enhanced speech signal E1 (231) using a parameter that changes based on the enhanced noise signal E2.

The noise suppression circuit 230 can be any one of an analog circuit, a digital circuit, and a mixture thereof. When the noise suppression circuit 230 is an analog circuit, the enhanced speech signal E1 (231) is converted into a digital signal by an A/D converter and used for digital control. On the other hand, when the noise suppression circuit 230 is a digital circuit, a signal from the microphone is converted into a digital signal by an A/D converter before input to the noise suppression circuit 230. If both an analog circuit and a digital circuit are included, for example, the subtracter 301 or 303 can be formed from an analog circuit, and the adaptive filter NF 302 or the adaptive filter XF 304 can be formed from an analog circuit controlled by a digital circuit. The noise suppression circuit 230 shown in FIG. 3 is one of circuit examples suitable for this embodiment. An existing circuit that subtracts the estimated noise signal from the mixture signal and outputs the enhanced speech signal is usable. Noise suppression can be performed by the characteristic structure of this embodiment including two microphones and a sound insulating block. For example, the adaptive filter XF 304 shown in FIG. 3 can be replaced with a circuit that outputs a predetermined level to filter a piece of diffused speech. In addition, the subtracter 301 and/or 303 can be replaced with an integrator that represents the estimated noise signal Y1 or the estimated speech signal Y2 as a coefficient to multiply the mixture signal 204 or the noise signal 205.

<<Arrangement of Speech Input Apparatus>>

Figure 4:
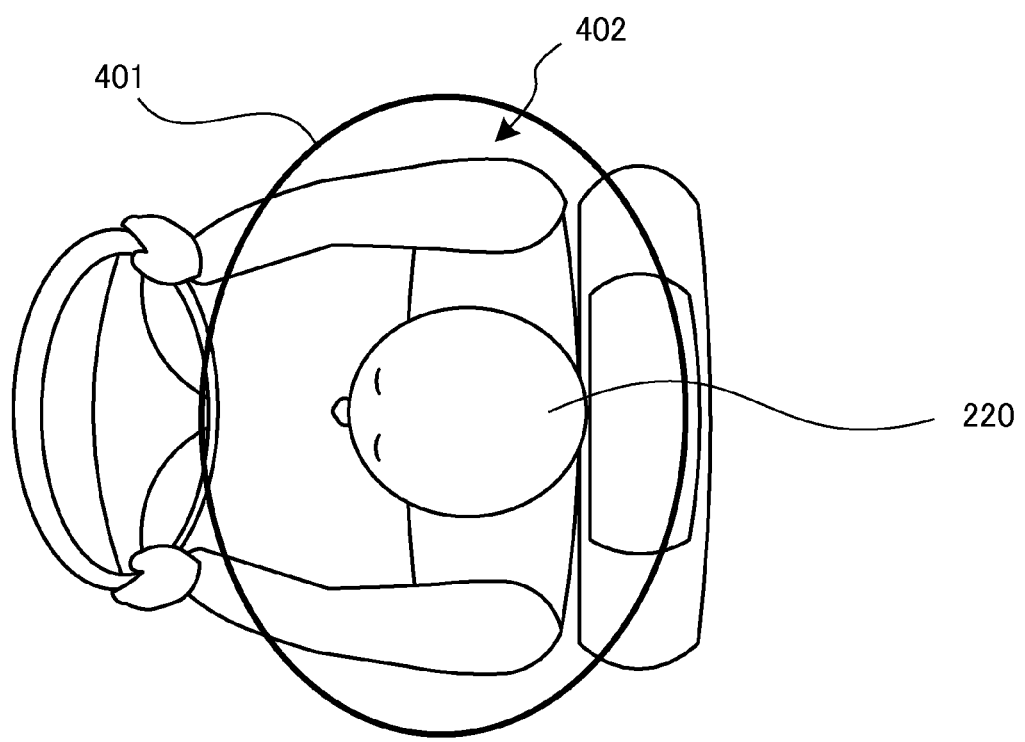
FIG. 4 is a view showing the arrangement range of the speech input apparatus according to the second embodiment of the present invention.

FIG. 4 is a view showing the arrangement range of the speech input apparatus 200 according to this embodiment. FIG. 4 is a view showing the driver's seat of a vehicle viewed from above. Note that the arrangement range will be described below as the relationship with the driver 220 on the driver's seat, and this also applies to other passengers on other seats.

The range where the speech input apparatus 200 according to this embodiment is arranged is a circular region 402 within a circular boundary 401 farthest from a point immediately above the head of the driver 220. Note that the circular boundary 401 represents the limit position the piece of speech uttered by the driver 220 sufficiently reaches.

Note that although the circular boundary 401 is shown in FIG. 4, it may be deformed depending on the internal structure of the vehicle. Although the arrangement range is provided behind the driver 220 as well, it is preferably provided ahead of or diagonally ahead of the driver 220. Since the arrangement range changes depending on the height of the mouth of the driver 220, for example, the arrangement may be moved to an appropriate position.

<<Sound Insulating Block>>

The material and shape of the sound insulating block 201 will be explained below.

(Material)

The sound insulating block is preferably made of a substance having a heavy mass and a high density. Such a substance needs larger energy to vibrate and can therefore prevent a sound from passing. The interior of the sound insulating block is preferably made of a soft material. Since a soft material easily absorbs a sound, unnecessary sound passage can be prevented by using the soft material inside the sound insulating block. However, to prevent resonance, the interior of the sound insulating block is preferably made of a material other than gases. The surface material on the first microphone side and that on the second microphone side are preferably separated without forming a continuous structure. If a continuous structure is used, the sound propagates through the surface material and passes through the sound insulating block. To prevent this, a three-layered structure including a soft material sandwiched between two surface materials is preferably used.

(Planar Shape)

Figure 5A:
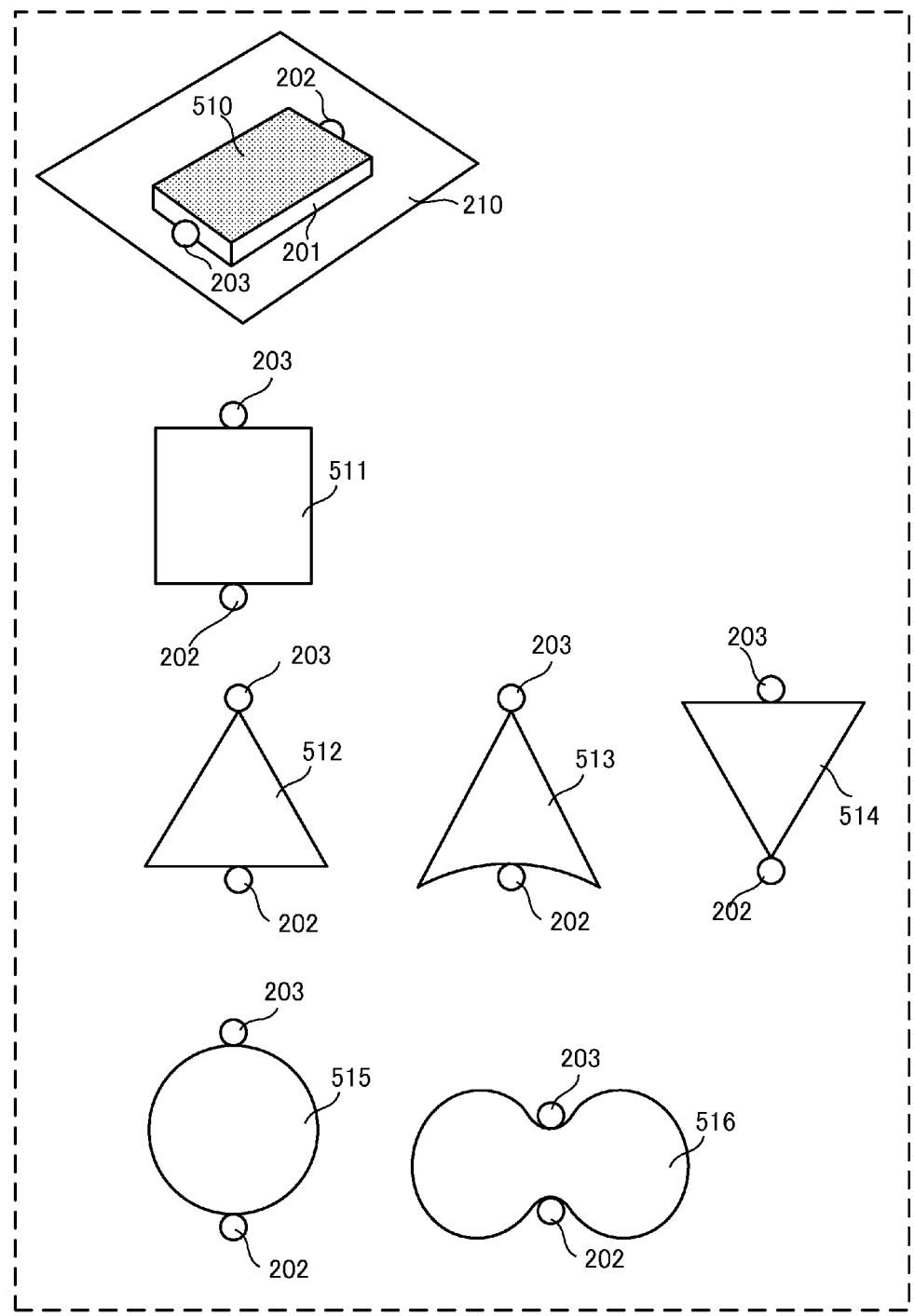
FIG. 5A is a view showing the planar shapes of a sound insulating block according to the second embodiment of the present invention.

FIG. 5A is a view showing the planar shapes of the sound insulating block 201 according to this embodiment. Note that the planar shape indicates a planar shape 510 of the sound insulating block 201 mapped onto the ceiling member 210, as shown on the top of FIG. 5A. Note that the planar shape is not limited to those shown in FIG. 5A. For example, FIG. 5A illustrates rectangular, triangular, and circular shapes. However, any other polygonal shape such as a pentagon or a hexagon may be used. The first microphone 202 and the second microphone 203 can be arranged at positions symmetrical with respect to the sound insulating block 201.

A planar shape 511 is a rectangle. The first microphone 202 is arranged on a side on the side close to the passenger (speaker), and the second microphone 203 is arranged on a side on the side far from the passenger. A planar shape 512 is a triangle. The first microphone 202 is arranged on the base on the side close to the passenger (speaker), and the second microphone 203 is arranged on the apex on the side far from the passenger. A planar shape 513 is a triangle with a recessed base. The first microphone 202 is arranged in the recess of the base on the side close to the passenger (speaker), and the second microphone 203 is arranged on the apex on the side far from the passenger. A planar shape 514 is a triangle. The first microphone 202 is arranged on the apex on the side close to the passenger (speaker), and the second microphone 203 is arranged on the base on the side far from the passenger.

A planar shape 515 is a circle. The first microphone 202 is arranged on a side on the side close to the passenger (speaker), and the second microphone 203 is arranged on a side on the side far from the passenger. Note that the shape may be an ellipse or any other distorted circular shape as long as it is circular. A planar shape 516 is a gourd shape. The first microphone 202 is arranged in the recess on the side close to the passenger (speaker), and the second microphone 203 is arranged in the recess on the side far from the passenger.

(Sectional Shape)

Figure 5B:
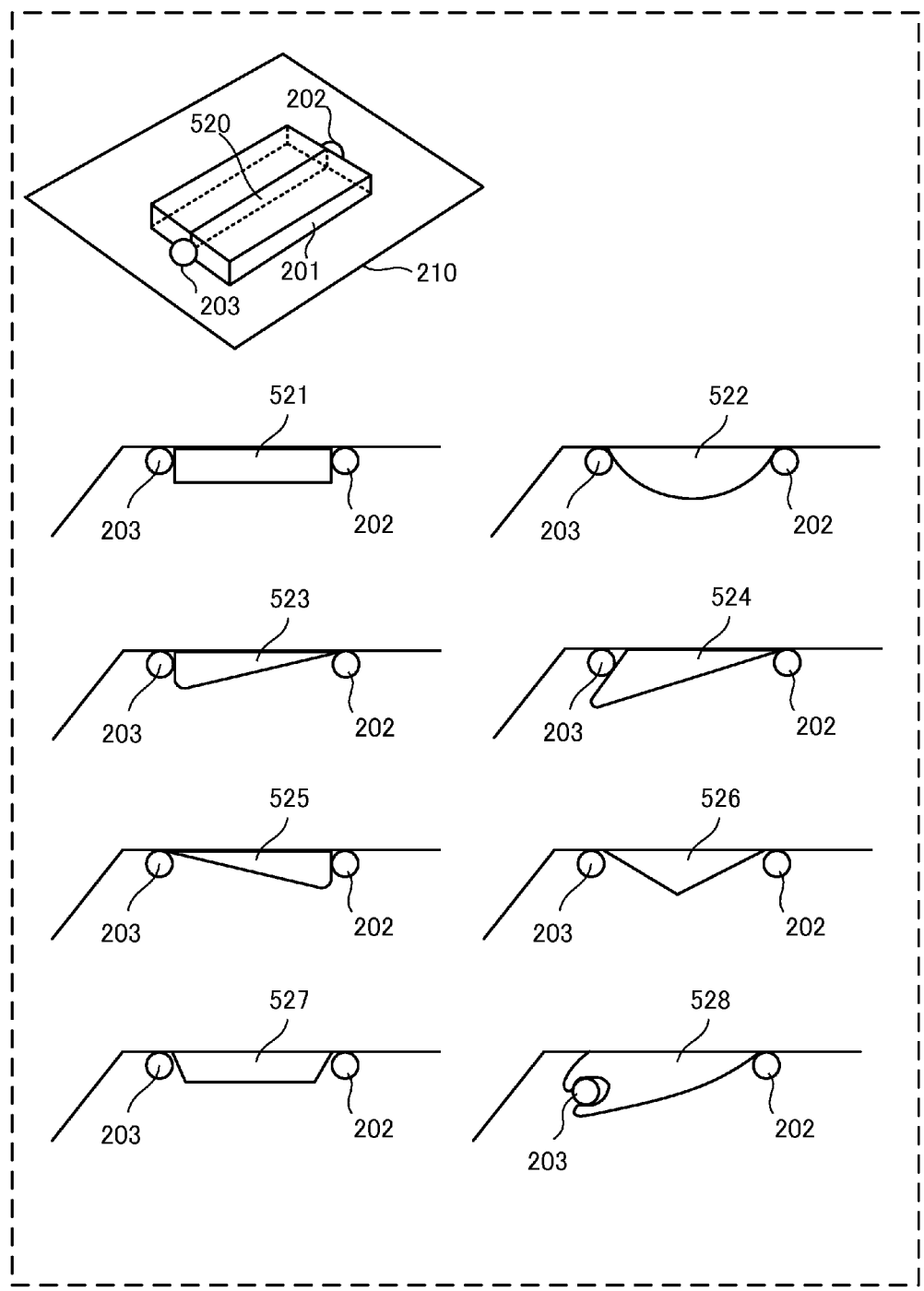
FIG. 5B is a view showing the sectional shapes of the sound insulating block according to the second embodiment of the present invention.

FIG. 5B is a view showing the vertical sectional shapes of the sound insulating block 201 according to this embodiment. Note that the sectional shape indicates a sectional shape 520 of the sound insulating block 201 taken along a plane connecting the first microphone 202 and the second microphone 203 in a direction perpendicular to the lower surface of the ceiling member 210, as shown on the top of FIG. 5B. Note that the sectional shape is not limited to those shown in FIG. 5B. For example, FIG. 5B illustrates characteristic shapes. However, a shape halfway between them may be used.

A sectional shape 521 is a rectangle. The first microphone 202 is arranged on a side on the side close to the passenger (speaker), and the second microphone 203 is arranged on a side on the side far from the passenger. A sectional shape 522 is an arch. The first microphone 202 is arranged on the side close to the passenger (speaker), and the second microphone 203 is arranged on the side far from the passenger. A sectional shape 523 is a shape similar to a right angled triangle whose one side other than the hypotenuse is located on the side of the ceiling member 210. The first microphone 202 is arranged on the side of the hypotenuse, and the second microphone 203 is arranged on the side of the other side other than the hypotenuse. The first microphone 202 is arranged at a point of the long side on the side close to the passenger (speaker), and the second microphone 203 is arranged on the short side on the side far from the passenger. A sectional shape 524 is an obtuse triangle in which a longer one of the sides making the obtuse angle is attached on the side of the ceiling member 210. The first microphone 202 is arranged near a place where the long side (side facing the obtuse apex) on the side close to the passenger (speaker) contacts the ceiling, and the second microphone 203 is arranged near the obtuse angle on the side far from the passenger. A sectional shape 525 is a shape similar to a right angled triangle. The first microphone 202 is arranged on the short side on the side close to the passenger (speaker), and the second microphone 203 is arranged at a point of the long side on the side far from the passenger.

A sectional shape 526 is a shape with the base located on the side of the ceiling member 210. The first microphone 202 is arranged at a point of a side on the side close to the passenger (speaker), and the second microphone 203 is arranged at a point of a side on the side far from the passenger. A sectional shape 527 is a trapezoid with the base located on the side of the ceiling member 210. The first microphone 202 is arranged at a point of the base on the side close to the passenger (speaker), and the second microphone 203 is arranged at a point of the base on the side far from the passenger. A sectional shape 528 is an obtuse triangle with a recessed short side. The first microphone 202 is arranged at a point of the long side on the side close to the passenger (speaker), and the second microphone 203 is arranged in the recess on the side far from the passenger.

(Three-Dimensional Shape: Combination of Planar Shape and Sectional Shape)

FIG. 6 is a view showing the combinations of planar shapes and sectional shapes and the three-dimensional shapes of the sound insulating block according to this embodiment. FIG. 6 is a table having the planar shapes shown in FIG. 5A in the horizontal direction and the sectional shapes shown in FIG. 5B in the vertical direction. A major characteristic three-dimensional shape is described in each cell. Note that the three-dimensional shapes are not limited to those described in the cells. Note that three-dimensional shapes formed by the planar shape 516 shown in FIG. 5A have no appropriate name, and corresponding cells are left blank.

According to this embodiment, since the sound insulating block insulates the voice of the passenger to the second microphone but does not divide the space in the vehicle, there is no difference in noise input between the first microphone and the second microphone. Hence, the noise suppressor can obtain a piece of high-quality speech with included noise reduced.

Third Embodiment

A speech input apparatus according to the third embodiment of the present invention will be described next. The speech input apparatus according to this embodiment is different from the second embodiment in that the sound insulating block is retractable and can be stored in a ceiling member 210 when it is not used. The rest of the components and operations is the same as in the second embodiment, and a detailed description thereof will be omitted.

According to this embodiment, since the sound insulating block can be stored when it is not used, the appearance of the ceiling is spoiled little, in addition to the effect of the second embodiment.

<<Arrangement of Speech Input Apparatus>>

Figure 7:
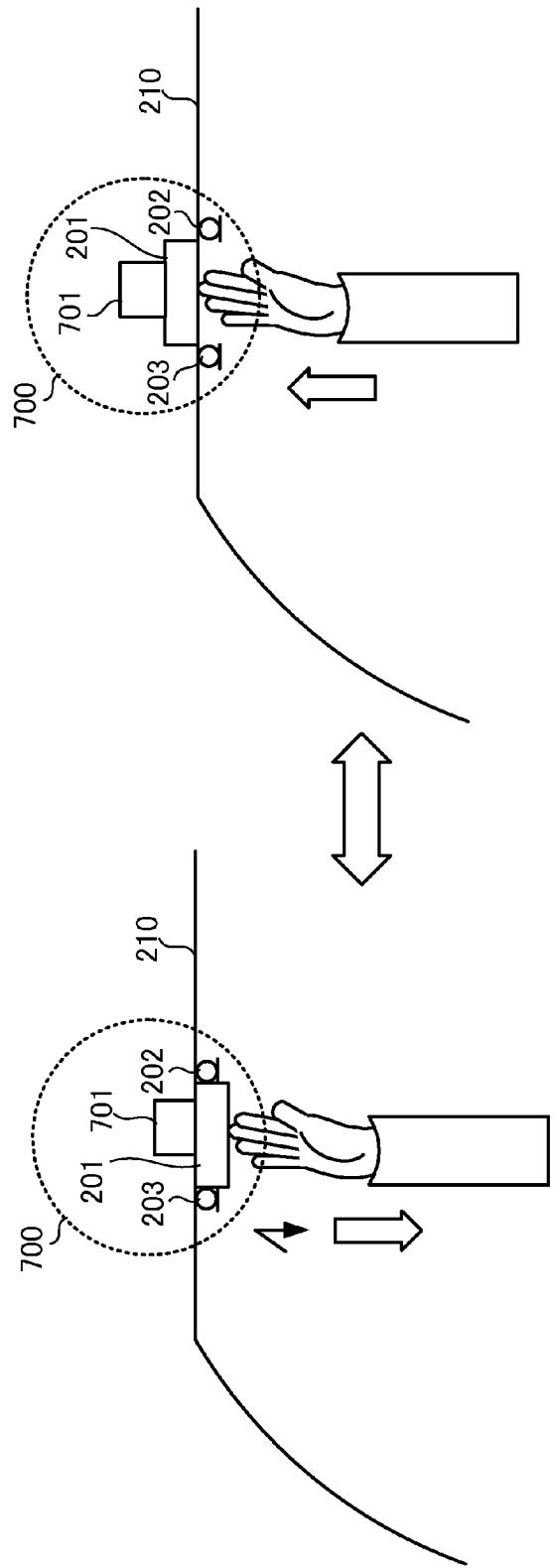
FIG. 7 is a view for explaining a speech input apparatus according to the third embodiment of the present invention.

FIG. 7 is a view for explaining a speech input apparatus 700 according to this embodiment.

The left view of FIG. 7 shows a state in which a sound insulating block 201 projects from the ceiling member 210 and functions to insulate the voice of a passenger and inhibit it from reaching a second microphone 203. The speech input apparatus 700 incorporates a retract mechanism 701 that assists extracting/storing the sound insulating block 201 from/in the ceiling member 210. The right view of FIG. 7 shows a state in which the sound insulating block 201 is stored in the ceiling member 210. In this state, the sound insulating block 201 does not function to inhibit the voice of the passenger from reaching the second microphone 203.

Note that the arrangement or operation of a noise suppression circuit 230 may change depending on whether the sound insulating block 201 is stored in the ceiling member 210. For example, when the sound insulating block 201 is stored, only input to a first microphone 202 may be used.

Referring to FIG. 7, the user manually extracts/stores the sound insulating block 201 from/in the ceiling member 210. For example, the retract mechanism 701 may be a vertical moving mechanism that is stored in the ceiling member 210 and locked when the user pushes up the sound insulating block 201 by the hand, as shown in the right view, and is unlocked and projects downward when the user slightly pushes up the sound insulating block 201 by the hand, as shown in the left view. Note that the retract mechanism 701 can use any known structure and is not limited. The first microphone 202 and the second microphone 203 may be fixed to the sound insulating block 201 and simultaneously project or be stored in this state.

Fourth Embodiment

A speech input apparatus according to the fourth embodiment of the present invention will be described next. The speech input apparatus according to this embodiment is different from the third embodiment in having a structure capable of automatically extracting or storing the sound insulating block from or in the ceiling member based on the environment in the vehicle. The rest of the components and operations is the same as in the third embodiment, and a detailed description thereof will be omitted. For example, see FIG. 7 of the third embodiment for the extracted/stored state of the sound insulating block.

According to this embodiment, it is possible to save the passenger from doing the retract operation for the sound insulating block, in addition to the effect of the third embodiment.

Note that the passenger's manual retract processing according to the third embodiment may be given a higher priority than the automatic retract processing of this embodiment.

<<Retract Structure for Sound Insulating Block>>

Figure 8:
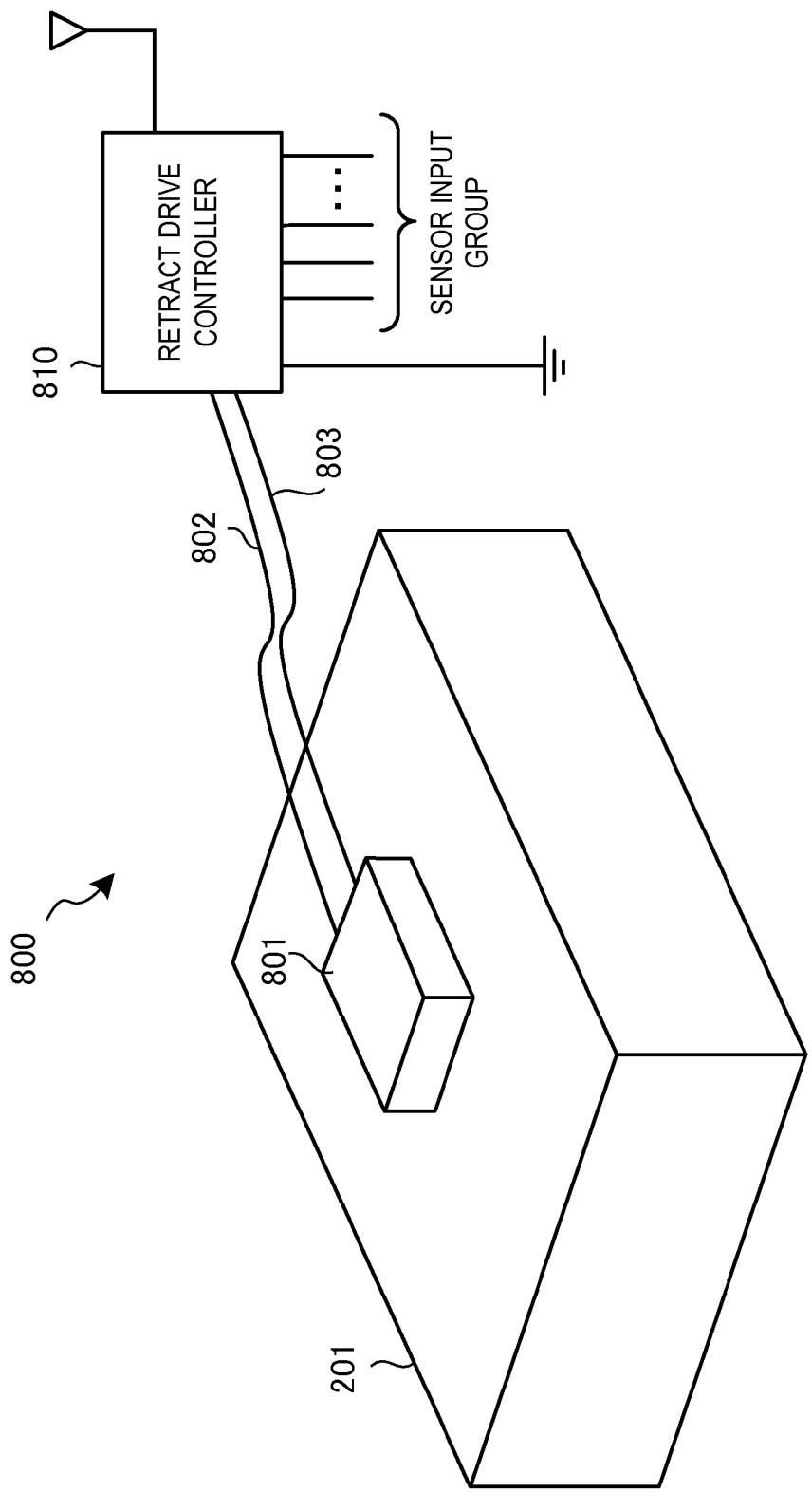
FIG. 8 is a view showing a retract structure for a sound insulating block according to the fourth embodiment of the present invention.

FIG. 8 is a view showing a retract structure 800 for a sound insulating block 201 according to this embodiment. Note that the retract structure 800 is not limited to that shown in FIG. 8.

The retract structure 800 includes a retract mechanism 801 that automatically extracts/stores the sound insulating block 201 from/in the ceiling member, and a retract drive controller 810 that controls drive of the retract mechanism 801. Note that the retract mechanism 801 may include a retract mechanism 701 shown in FIG. 7 and an activation source such as a motor that drives it. The retract mechanism 801 and the retract drive controller 810 are connected by electric wires configured to apply drive voltages 802 and 803 that reverse the directions between the extraction mode and the storage mode of the sound insulating block 201. The retract drive controller 810 receives input of an input signal group from sensors, which represents a condition to extract/store the sound insulating block 201. If the condition to extract/store the sound insulating block 201 is met, a current flows between the drive voltages 802 and 803.

(Retract Drive Controller)

Figure 9:
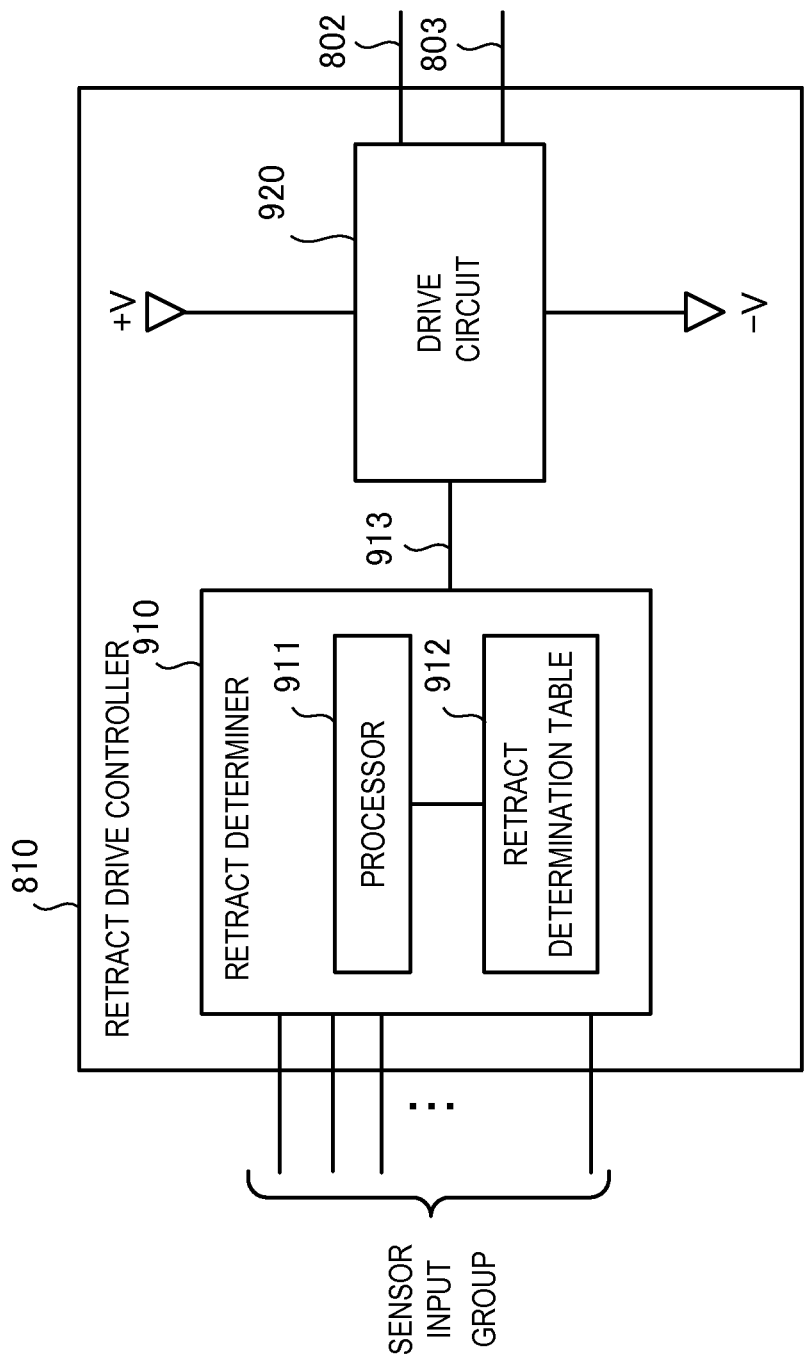
FIG. 9 is a block diagram showing the arrangement of a retract drive controller for the sound insulating block according to the fourth embodiment of the present invention.

FIG. 9 is a block diagram showing the arrangement of the retract drive controller 810 for the sound insulating block 201 according to this embodiment. Note that the retract drive controller 810 is not limited to that shown in FIG. 9.

The retract drive controller 810 includes a retract determiner 910 that determines, based on input of the sensor input group, whether to extract or store the sound insulating block 201, and a drive circuit 920 that drives the retract mechanism 801 in accordance with the result of the retract determiner 910.

The retract determiner 910 includes a processor 911 that controls determining whether to extract or store the sound insulating block 201, and a retract determination table 912 used to determine whether to extract or store the sound insulating block 201. The retract determination table 912 stores the input of the sensor input group and a determination result 913 representing whether to extract or store the sound insulating block 201 in association with each other.

The drive circuit 920 receives the determination result 913 from the retract determiner 910 and applies the drive voltages 802 and 803 to the retract mechanism 801. Note that the drive circuit 920 is not limited, and various known circuits are applicable.

(Retract Determination Table)

FIG. 10 is a view showing the arrangement of the retract determination table 912 according to this embodiment. The retract determination table 912 is used by the retract determiner 910 of the retract drive controller 810 to determine whether to retract the sound insulating block 201.

The retract determination table 912 is a table that decides the determination result 913 of extraction/storage of the sound insulating block 201 using data from various sensor input groups as conditions. Examples of the conditions to extract the sound insulating block 201 based on various sensor input groups are a case 1001 where the vehicle speed exceeds a threshold α, a case 1002 where air conditioner noise exceeds a threshold β, and a case 1003 where windshield wipers operate. Note that the conditions are not limited to those shown in FIG. 10. For example, a case where a blinker operates, a case where a hazard lamp operates, a case where the engine speed or motor speed exceeds a predetermined value, a case where the volume of the audio system exceeds a predetermined value, and a case where a voice response system such as a car navigation system operates can also be assumed as the conditions to extract the sound insulating block 201. Note that the conditions are not limited to these. Basically, when noise is larger than a predetermined threshold, the sound insulating block 201 is extracted. When noise is equal to or smaller than the predetermined threshold, the sound insulating block 201 is stored.

Note that storage is determined here depending on whether noise exceeds a predetermined threshold. However, threshold determination may be done as multistage determination, and the sound insulating block 201 may be extracted in multiple stages. For example, when the vehicle speed is low/medium/high, the degree of extraction of the sound insulating block 201 may be set to 0/moderate/full.

<<Procedure of Retract Processing>>

FIG. 11 is a flowchart showing the procedure of retract processing for the sound insulating block 201 according to this embodiment. This flowchart shows the procedure of causing the processor 911 shown in FIG. 9 to decide the determination result 913 of extraction/storage of the sound insulating block 201 using data from various sensor input groups as the conditions without using the retract determination table 912. Note that FIG. 11 shows some of the conditions of extraction/storage of the sound insulating block 201, and the conditions are not limited to these.

In step S1101, the processor 911 determines whether the vehicle speed exceeds the threshold α. If the vehicle speed exceeds the threshold α, the processor 911 pushes the sound insulating block 201 out of the ceiling member in step S1109.

If the vehicle speed is equal to or less than the threshold α, the processor 911 determines in step S1103 whether air conditioner noise exceeds the threshold β. If the air conditioner noise exceeds the threshold β, the processor 911 pushes the sound insulating block 201 out of the ceiling member in step S1109.

If the air conditioner noise is equal to or less than the threshold β, the processor 911 determines in step S1105 whether the windshield wipers operate. If the windshield wipers operate, the processor 911 pushes the sound insulating block 201 out of the ceiling member in step S1109.

From then on, conditions to push the sound insulating block 201 out of the ceiling member are determined. If none of the conditions are met, or a condition to store the sound insulating block 201 in the ceiling member is met, the processor 911 stores the sound insulating block 201 in the ceiling member 210 in step S1107.

According to this embodiment, it is possible to save the passenger from doing the retract operation for the sound insulating block, in addition to the effect of the third embodiment.

Fifth Embodiment

A speech input apparatus according to the fifth embodiment of the present invention will be described next. The speech input apparatus according to this embodiment is different from the first to fourth embodiments in that the sound insulating block can rotate and turn a first microphone 202 in the direction of a passenger to input a piece of speech. The rest of the components and operations is the same as in the first to fourth embodiments, and a detailed description thereof will be omitted.

According to this embodiment, since the first microphone 202 can be turned to the passenger to input a piece of speech, a piece of high-quality speech with included noise reduced can be obtained not only from a passenger on a specific seat but also from a passenger on a desired seat.

Note that in this embodiment, the first microphone 202 and a second microphone 203 are arranged on side surfaces of the sound insulating block. Hence, when a sound insulating block 201 rotates, the first microphone 202 and the second microphone 203 also rotate. The sound insulating block, the first microphone 202, and the second microphone 203 may be placed on the same rotary plate. The sound insulating block 201 itself may be prohibited from rotating, and only the first microphone 202 and the second microphone 203 arranged around the sound insulating block 201 may rotate.

<<Speech Input Apparatus>>

Figure 12A:
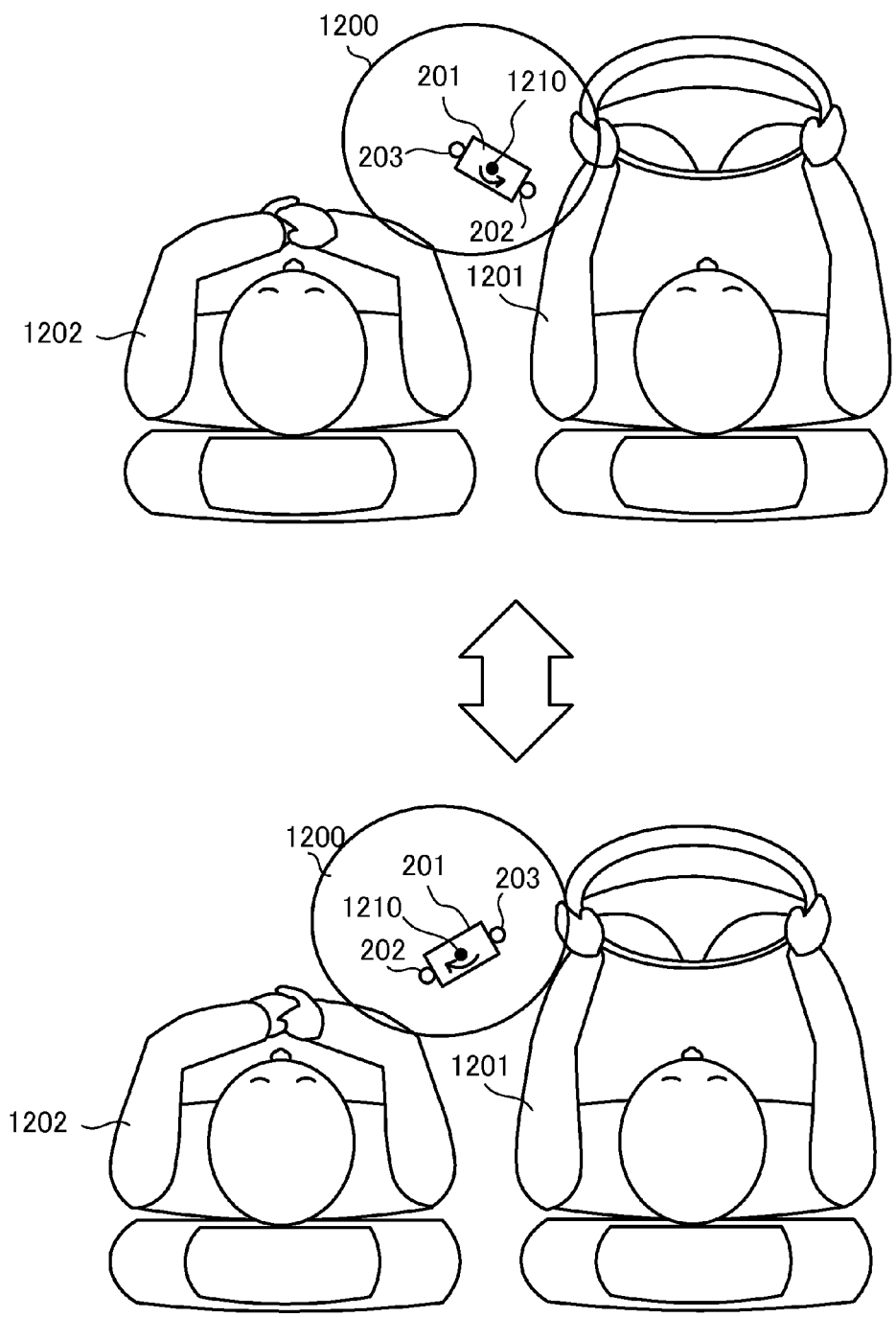
FIG. 12A is a view for explaining a speech input apparatus according to the fifth embodiment of the present invention.

FIG. 12A is a view for explaining a speech input apparatus 1200 according to this embodiment.

In the upper view of FIG. 12A, a driver 1201 and a passenger 1202 take the driver's seat and the assistant driver's seat, respectively. To input a piece of speech uttered by the driver 1201, the speech input apparatus 1200 rotates the sound insulating block 201, the first microphone 202, and the second microphone 203 to turn the first microphone in the direction of the driver 1201 such that the piece of speech uttered by the driver 1201 is input to the first microphone 202 but not to the second microphone 203.

In the lower view of FIG. 12A, the driver 1201 and the passenger 1202 take the driver's seat and the assistant driver's seat, respectively. To input a piece of speech uttered by the passenger 1202, the speech input apparatus 1200 rotates the sound insulating block 201, the first microphone 202, and the second microphone 203 to turn the first microphone in the direction of the passenger 1202 such that the piece of speech uttered by the passenger 1202 is input to the first microphone 202 but not to the second microphone 203.

In FIG. 12A, the sound insulating block 201 rotates about a rotation shaft 1210. Note that the rotation is made manually by the driver 1201 or the passenger 1202.

Note that in this embodiment, the sound insulating block 201 rotates to change the directions of the first microphone 202 and the second microphone 203. However, a plurality of microphones may be arranged in advance and selectively used. For example, switching may be done between the combination of a first microphone 202a and a second microphone 203a and the combination of a first microphone 202b and a second microphone 203b in accordance with the direction, as in an example shown in FIG. 12B. Switching of the microphone combination may be done manually by arranging a switch. Alternatively, the speech input apparatus 1200 may include a switching controller to detect the direction of speech utterance and switch the microphone combination so as to turn the first microphone in the direction of utterance. With this arrangement, the same effect as described above can be obtained without the rotation operation.

Sixth Embodiment

A speech input apparatus according to the sixth embodiment of the present invention will be described next. The speech input apparatus according to this embodiment is different from the fifth embodiment in that the sound insulating block rotates to automatically turn the first microphone in the direction of a passenger to input a piece of speech based on the environment in the vehicle. This also applies to a case where the sound insulating block itself is prohibited from rotating, and only the microphones arranged around rotate. The rest of the components and operations is the same as in the fifth embodiment, and a detailed description thereof will be omitted. Note that see FIG. 12 of the fifth embodiment for the manner the sound insulating block rotates in the direction of a passenger to input a piece of speech.

According to this embodiment, it is possible to save the passenger from doing the rotation operation for the sound insulating block, in addition to the effect of the fifth embodiment.

Note that the passenger's manual rotation processing according to the fifth embodiment may be given a higher priority than the automatic rotation processing of this embodiment.

<<Rotation Structure for Sound Insulating Block>>

Figure 13:
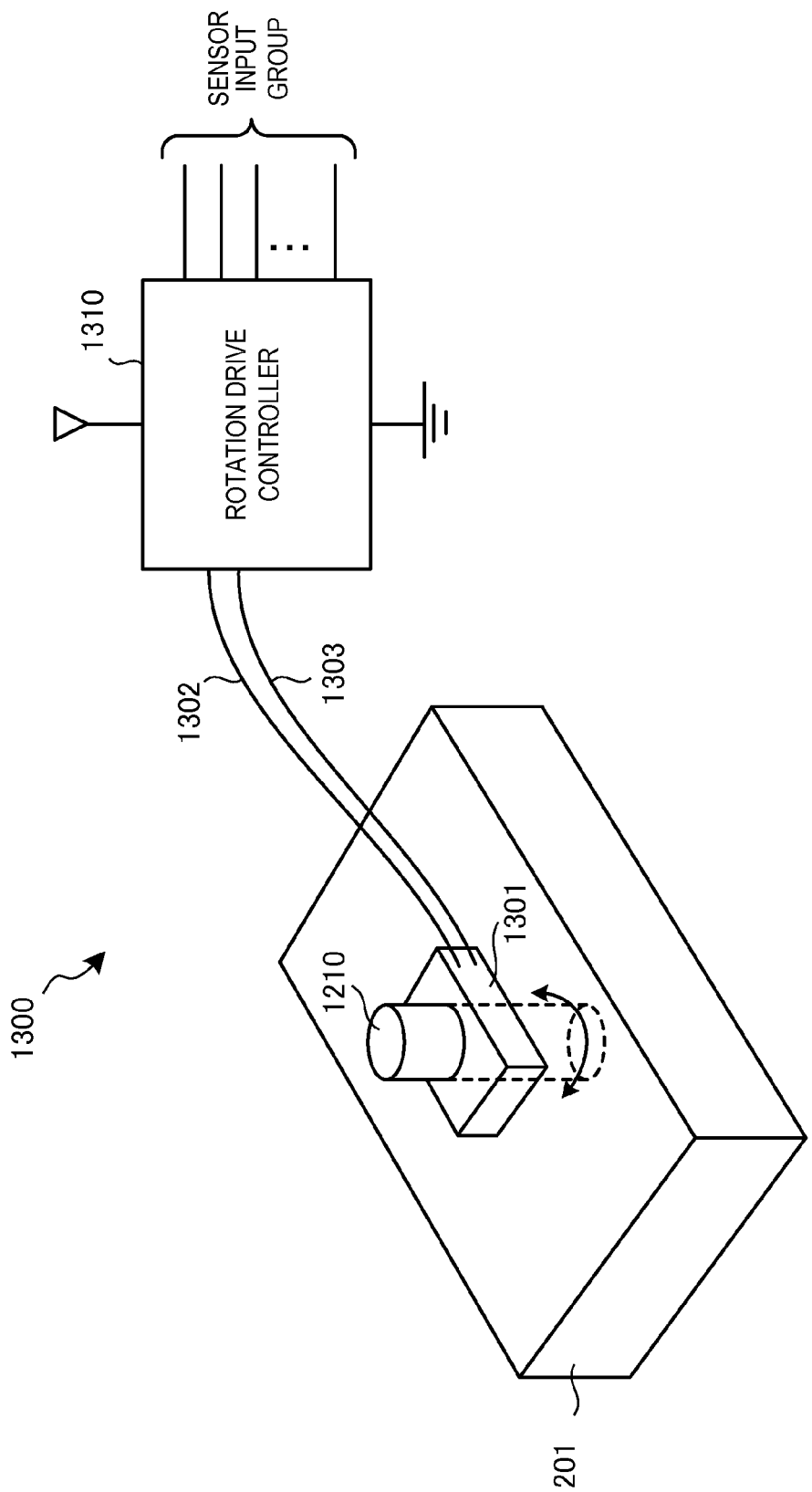
FIG. 13 is a view showing a rotation structure for a sound insulating block according to the sixth embodiment of the present invention.

FIG. 13 is a view showing a rotation structure 1300 for a sound insulating block 201 according to this embodiment. Note that the rotation structure 1300 for the sound insulating block 201 is not limited to that shown in FIG. 13.

The rotation structure 1300 for the sound insulating block 201 includes a rotation mechanism 1301 that rotates a rotation shaft 1210 of the sound insulating block 201, and a rotation drive controller 1310 that controls drive of the rotation mechanism 1301. Note that the rotation mechanism 1301 may include an activation source such as a motor that rotates the rotation shaft 1210 of the sound insulating block 201. The rotation mechanism 1301 and the rotation drive controller 1310 are connected by electric wires configured to apply drive voltages 1302 and 1303 that reverse the directions depending on the direction to rotate the sound insulating block 201. The rotation drive controller 1310 receives input of an input signal group from sensors, which represents a condition to rotate the sound insulating block 201. If the condition to rotate the sound insulating block 201 is met, a current flows between the drive voltages 1302 and 1303.

(Rotation Drive Controller)

Figure 14:
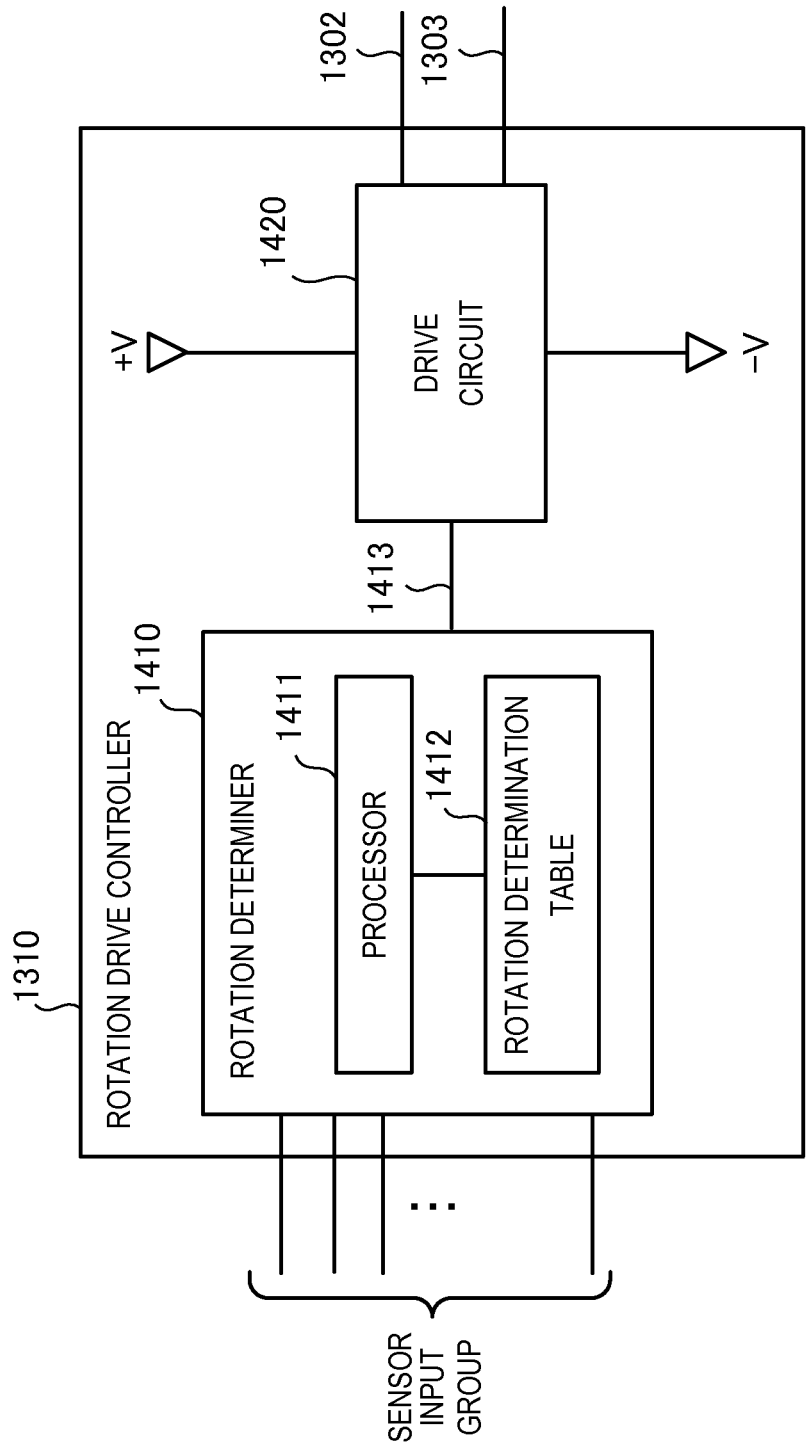
FIG. 14 is a block diagram showing the arrangement of a rotation drive controller for the sound insulating block according to the sixth embodiment of the present invention.

FIG. 14 is a block diagram showing the arrangement of the rotation drive controller 1310 for the sound insulating block 201 according to this embodiment. Note that the rotation drive controller 1310 is not limited to that shown in FIG. 14.

The rotation drive controller 1310 includes a rotation determiner 1410 that determines, based on input of the sensor input group, whether to rotate the sound insulating block 201 and the rotation direction, and a drive circuit 1420 that drives the rotation mechanism 1301 in accordance with the result of the rotation determiner 1410.

The rotation determiner 1410 includes a processor 1411 that controls determining whether to rotate the sound insulating block 201 and the rotation direction, and a rotation determination table 1412 used to determine whether to rotate the sound insulating block 201 and the rotation direction. The rotation determination table 1412 stores the input of the sensor input group and a determination result 1413 representing whether to rotate the sound insulating block 201 and the rotation direction in association with each other.

The drive circuit 1420 receives the determination result 1413 from the rotation determiner 1410 and applies the drive voltages 1302 and 1303 to the rotation mechanism 1301. Note that the drive circuit 1420 is not limited, and various known circuits are applicable.

(Rotation Determination Table)

Figure 15:
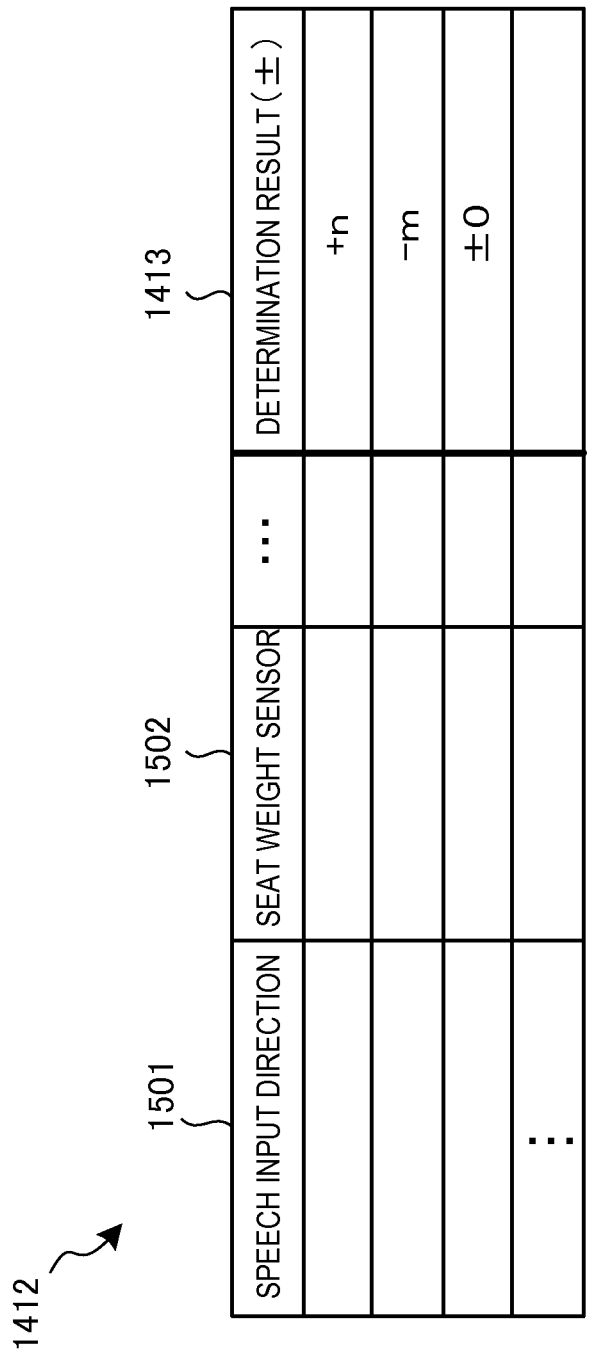
FIG. 15 is a view showing the arrangement of a rotation determination table according to the sixth embodiment of the present invention.

FIG. 15 is a view showing the arrangement of the rotation determination table 1412 according to this embodiment. The rotation determination table 1412 is used by the rotation determiner 1410 of the rotation drive controller 1310 to determine how much and in which direction the sound insulating block 201 should be rotated.

The rotation determination table 1412 is a table that decides the determination result 1413 representing whether to rotate the sound insulating block 201 and the rotation direction using data from various sensor input groups as conditions. Examples of the conditions to rotate the sound insulating block 201 based on various sensor input groups are a direction 1501 of a speech input from the first microphone 202 and the second microphone 203, a sitting position 1502 of a passenger measured by a seat weight sensor under a seat, and other manual instructions from the driver's seat. Note that the conditions are not limited to those shown in FIG. 15. Basically, toward the sitting position of the passenger to input a piece of speech, the sound insulating block 201 and the second microphone 203 are rotated such that the sound insulating block 201 insulates the piece of speech, and the first microphone 202 is rotated in the direction of the passenger so as to input the piece of speech as much as possible. Actually, the passenger, the first microphone 202, the sound insulating block 201, and the second microphone 203 are rotated such that they are arranged in a line from the passenger. The direction of the piece of speech may be estimated from the difference between the speech level input to the first microphone 202 and that input to the second microphone 203, and the sound insulating block 201 may be rotated to turn the first microphone 202 in the direction of the passenger who utters the piece of speech. The technique of estimating the direction of the piece of speech from the difference between the speech levels input to two microphones is a known technique, and a description thereof will be omitted. The direction of the piece of speech may be estimated from the phase difference between the speech signal input to the first microphone 202 and that input to the second microphone 203, and the sound insulating block 201 may be rotated to turn the first microphone 202 in the direction of the passenger who utters the piece of speech. The technique of estimating the direction of the piece of speech from the phase difference between the speech signals input to two microphones is a technique known as DOA estimation, and a detailed description thereof will be omitted here.

<<Procedure of Rotation Processing>>

Figure 16:
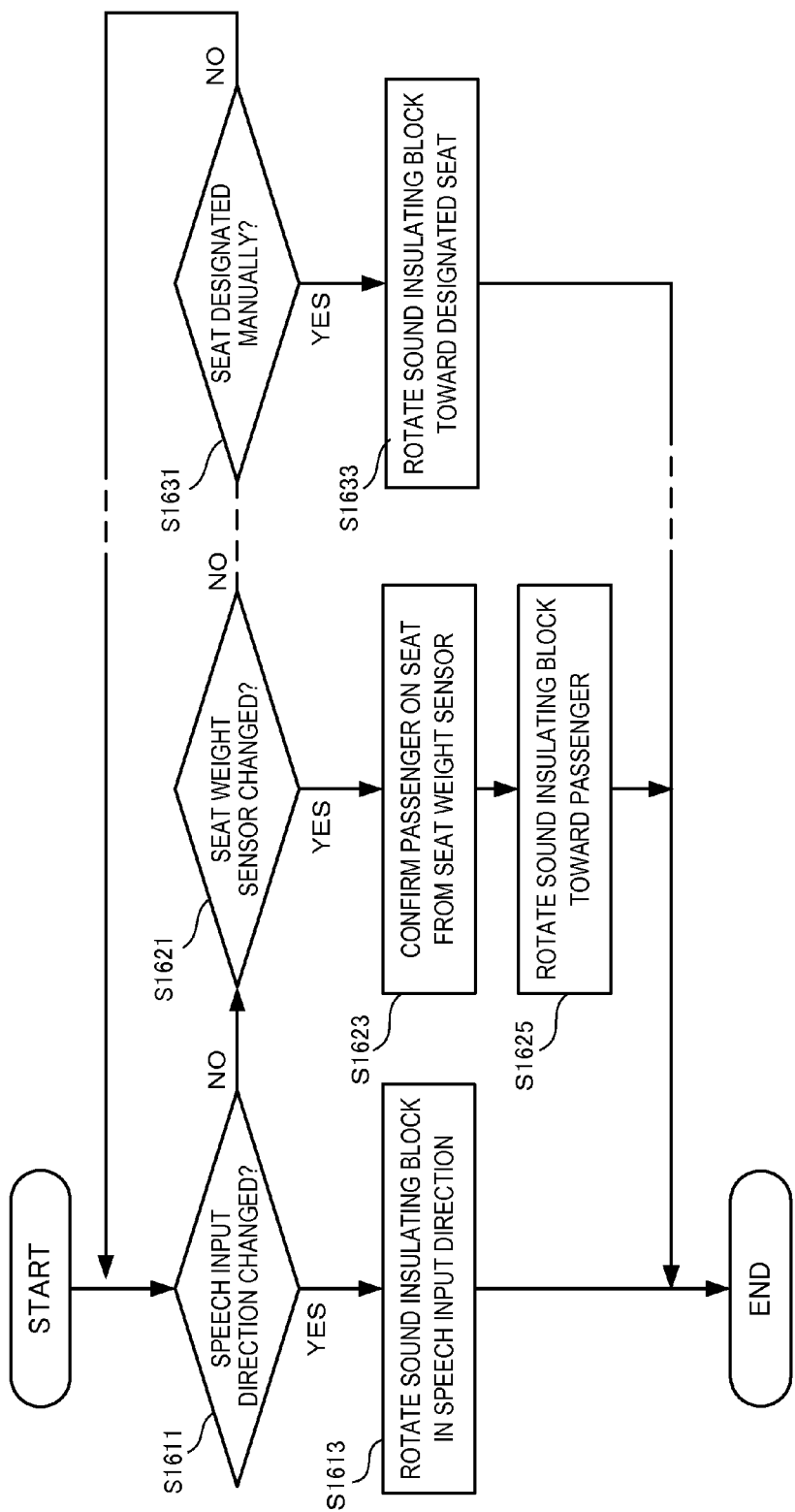
FIG. 16 is a flowchart showing the procedure of rotation processing for the sound insulating block according to the sixth embodiment of the present invention.

FIG. 16 is a flowchart showing the procedure of rotation processing for the sound insulating block 201 according to this embodiment. This flowchart shows the procedure of causing the processor 1411 shown in FIG. 14 to decide the determination result 1413 of rotation of the sound insulating block 201 using data from various sensor input groups as the conditions without using the rotation determination table 1412. Note that FIG. 16 shows some of the conditions of rotation of the sound insulating block 201, and the conditions are not limited to these.

In step S1611, the processor 1411 determines based on microphone input whether the speech input direction has changed. Upon determining that the speech input direction has changed, the processor 1411 rotates the sound insulating block 201 (or microphone) in step S1613 such that the first microphone 202 turns in the speech input direction, and the sound insulating block 201 insulates the speech input to the second microphone 203.

Upon determining that the speech input direction has not changed, the processor 1411 determines in step S1621 whether the seat weight sensor has changed. That is, the seat weight sensor detects a change when a passenger sits on a seat or stands up. If the seat weight sensor has changed, in step S1623, the processor 1411 confirms, based on the information from the seat weight sensor, the direction to turn the speech input apparatus according to this embodiment. Note that in this confirmation, instead of simply inputting only the change in the seat weight sensor, a piece of speech uttered by a passenger sitting on the seat behind the driver's seat may preferentially be input in advance, or a piece of speech to be input may be selected in accordance with an algorism set by the user in advance.

If the seat weight sensor has not changed, the processor 1411 determines in step S1631 whether the seat where the passenger of the speech input target is to sit is manually designated. If the seat where the passenger of the speech input target is to sit is designated, the processor 1411 rotates the sound insulating block 201 toward the designated seat in step S1633.

According to this embodiment, it is possible to save the passenger from doing the rotation operation for the sound insulating block, in addition to the effect of the fifth embodiment.

Seventh Embodiment

A speech input apparatus according to the seventh embodiment of the present invention will be described next. The speech input apparatus according to this embodiment is different from the second to sixth embodiments in that the speech input apparatus includes a plurality of speech input sets each including a sound insulating block, a first microphone, and a second microphone, the speech input sets are arranged at a plurality of positions in a vehicle, and a speech input set close to the seat of a passenger to input a piece of speech can be selected. The rest of the components and operations is the same as in the second to sixth embodiments, and a detailed description thereof will be omitted.

According to this embodiment, it is possible to catch not only the voice of a passenger sitting on the driver's seat or assistant driver's seat but also the voice of a passenger sitting on any seat in a vehicle and obtain a high-quality speech signal.

<<Arrangement of Speech Input Apparatus>>

Figure 17:
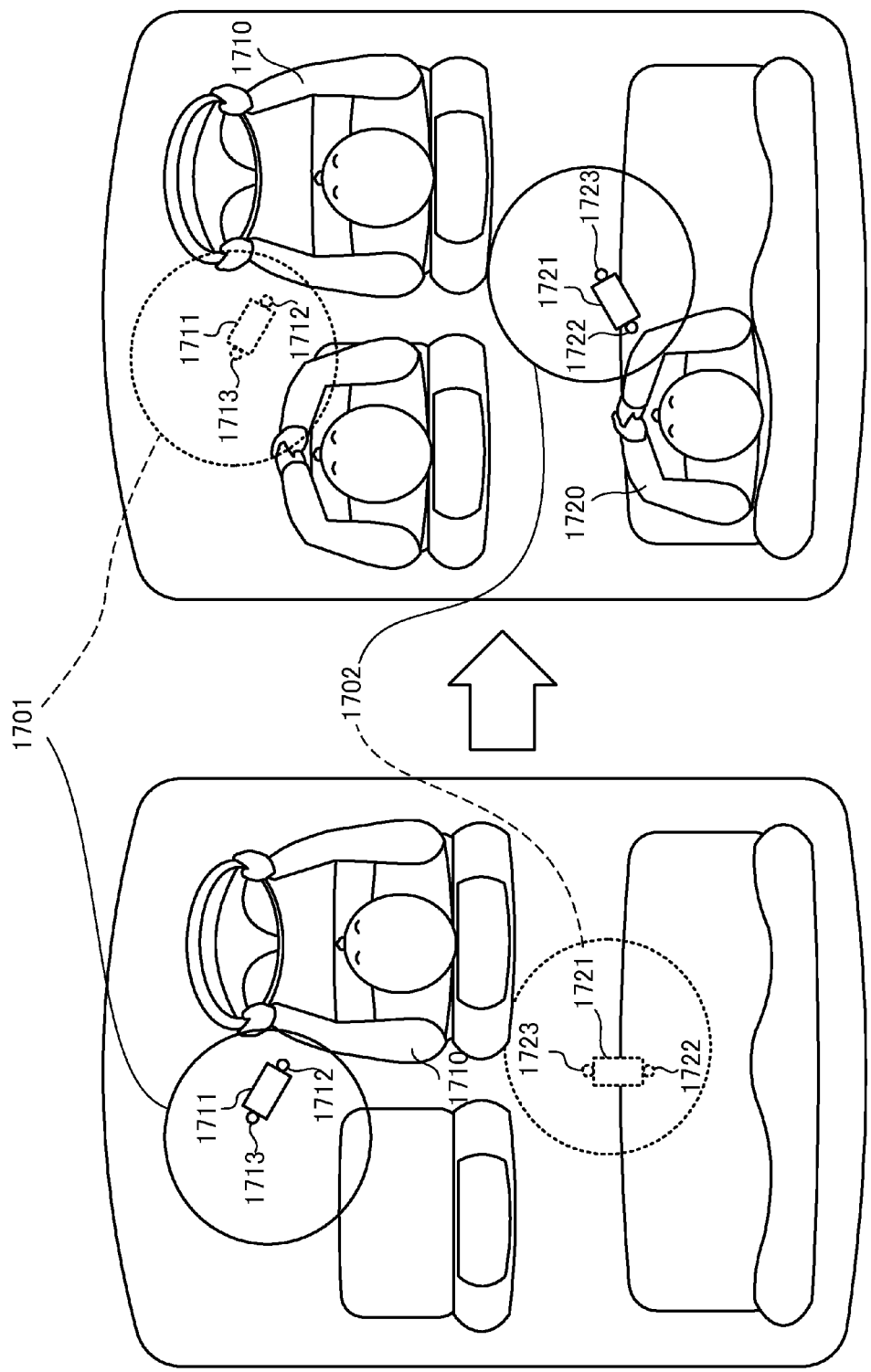
FIG. 17 is a view for explaining a speech input apparatus according to the seventh embodiment of the present invention.

FIG. 17 is a view for explaining the speech input apparatus according to this embodiment. Referring to FIG. 17, a plurality of speech input sets (corresponding to speech input apparatuses in this embodiment) each including a sound insulating block, a first microphone, and a second microphone are arranged in a vehicle. FIG. 17 shows an example in which one speech input set 1701 is provided for the front seats including the driver's seat and the assistant driver's seat, and one speech input set 1702 is provided for the rear seats. However, one speech input set may be provided for each seat.

The speech input set 1701 includes a sound insulating block 1711, a first microphone 1712, and a second microphone 1713. The speech input set 1702 includes a sound insulating block 1721, a first microphone 1722, and a second microphone 1723.

In this embodiment, from the plurality of speech input sets, a speech input set arranged in correspondence with the seat of a passenger to input a piece of speech is selected based on an instruction or automatically selected based on the input of sensor input group. In the left view of FIG. 17, the speech input set 1701 for the front seats is selected out of the speech input set 1701 and the speech input set 1702 and turned in the direction to input a piece of speech uttered by a driver 1710. On the other hand, in the right view of FIG. 17, the speech input set 1702 for the rear seats is selected out of the speech input set 1701 and the speech input set 1702 and turned in the direction to input a piece of speech uttered by a passenger 1720 behind the driver's seat.

(Speech Input Set Selector)

FIG. 18 is a block diagram showing the arrangement of a speech input set selector 1800 according to this embodiment. Note that the arrangement of the speech input set selector 1800 is not limited to that shown in FIG. 18.

The speech input set selector 1800 includes a selection controller 1810, a selector 1820, and a manual selector 1830.

The selection controller 1810 includes a speech input set selection table 1812. A processor 1811 outputs a selection signal 1813 of a speech input set based on input of the sensor input group. The selector 1820 includes a selector 1821 that selects input from the first microphone, a selector 1822 that selects input from the second microphone, and a selector 1823 that selects a control signal for the sound insulating block. The selector 1820 selects input from the plurality of speech input sets in correspondence with the selection signal. The manual selector 1830 generates the selection signal 1813 for manual selection and outputs it to the selector 1820.

(Speech Input Set Selection Table)

Figure 19:
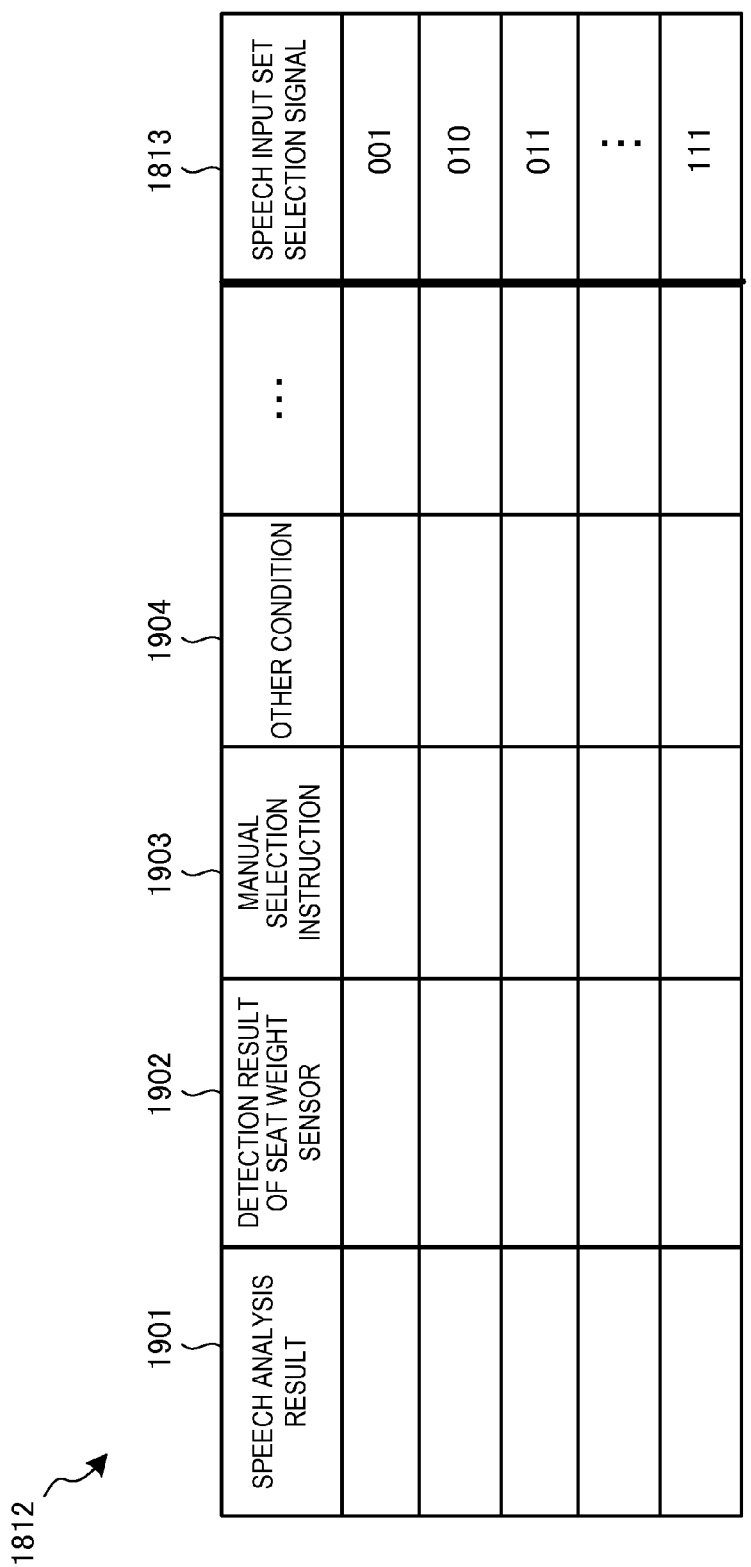
FIG. 19 is a view showing the arrangement of a speech input set selection table according to the seventh embodiment of the present invention.

FIG. 19 is a view showing the arrangement of the speech input set selection table 1812 according to this embodiment. The speech input set selection table 1812 is used by the selection controller 1810 of the speech input set selector 1800 to generate the selection signal to the selector 1820.

The speech input set selection table 1812 stores the selection signal 1813 of a speech input set in correspondence with a speech analysis result (result representing a location where a piece of speech is uttered) 1901, a detection result 1902 of a seat weight sensor, a manual selection instruction 1903, and other condition 1904, which serve as speech input set selection conditions.

<<Speech Input Set Selection Processing>>

FIG. 20 is a flowchart showing the procedure of speech input set selection processing according to this embodiment. This flowchart shows the procedure of causing the processor 1811 shown in FIG. 18 to output the selection signal 1813 of a speech input set using data from various sensor input groups as the conditions without using the speech input set selection table 1812. Note that FIG. 20 shows some of the speech input set selection conditions, and the conditions are not limited to these.

In step S2001, the processor 1811 determines whether a speech input set change instruction is manually input. If a speech input set change instruction is input, the processor 1811 analyzes the speech input set selection contents in step S2007, and performs selection processing of a desired speech input set in step S2009.

If a speech input set change instruction is not input, the processor 1811 determines in step S2003 whether the input from the seat weight sensor has changed. If the input from the seat weight sensor has changed, the processor 1811 analyzes the speech input set selection contents in step S2007, and performs selection processing of a desired speech input set in step S2009.

If the input from the seat weight sensor has not changed, the processor 1811 maintains the current selection of the speech input set in step S2005.

According to this embodiment, it is possible to catch not only the voice of a passenger sitting on the driver's seat or assistant driver's seat but also the voice of a passenger sitting on any seat in a vehicle and obtain a high-quality speech signal.

Eighth Embodiment

A speech input apparatus according to the eighth embodiment of the present invention will be described next. The speech input apparatus according to this embodiment is different from the second to seventh embodiments in that a sound insulating block, a first microphone, and a second microphone are integrated. The rest of the components and operations is the same as in the second to seventh embodiments, and a detailed description thereof will be omitted.

According to this embodiment, it is unnecessary to separately prepare and arrange the sound insulating block, the first microphone, and the second microphone. When the user easily places a component, a piece of high-quality speech with included noise reduced can be obtained. In addition, easy placement can be done by wires and connector connection in a vehicle.

<<Speech Input Apparatus>>

Figure 21:
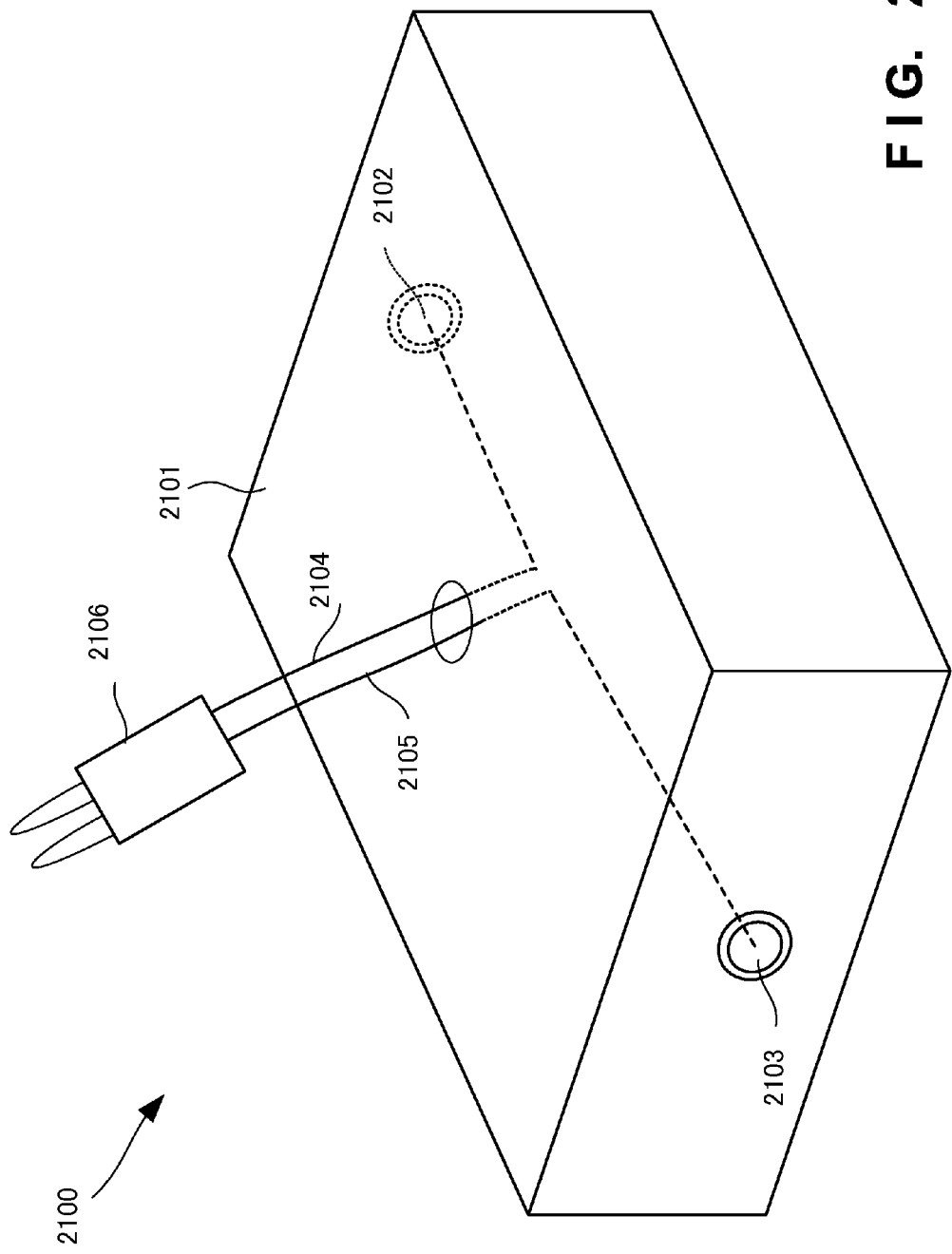
FIG. 21 is a perspective view showing the arrangement of a speech input apparatus according to the eighth embodiment of the present invention.

FIG. 21 is a perspective view showing the arrangement of a speech input apparatus 2100 according to this embodiment. Note that the integral structure is not limited to that shown in FIG. 21.

The speech input apparatus 2100 includes a sound insulating block 2101, and a first microphone 2102 and a second microphone 2103 which are integrated with the sound insulating block 2101. Signals from the first microphone 2102 and the second microphone 2103 are extracted by wires 2104 and 2105 which are led in the sound insulating block 2101 and connected to a connector 2106.

Ninth Embodiment

A speech input apparatus according to the ninth embodiment of the present invention will be described next. The speech input apparatus according to this embodiment is different from the second to eighth embodiments in that a noise suppression circuit is integrated with a sound insulating block and outputs a speech signal with noise suppressed. The rest of the components and operations is the same as in the second to eighth embodiments, and a detailed description thereof will be omitted.

According to this embodiment, even if an onboard apparatus does not include the noise suppression circuit of this embodiment, a piece of high-quality speech with included noise reduced can be obtained.

<<Speech Input Apparatus>>

Figure 22:
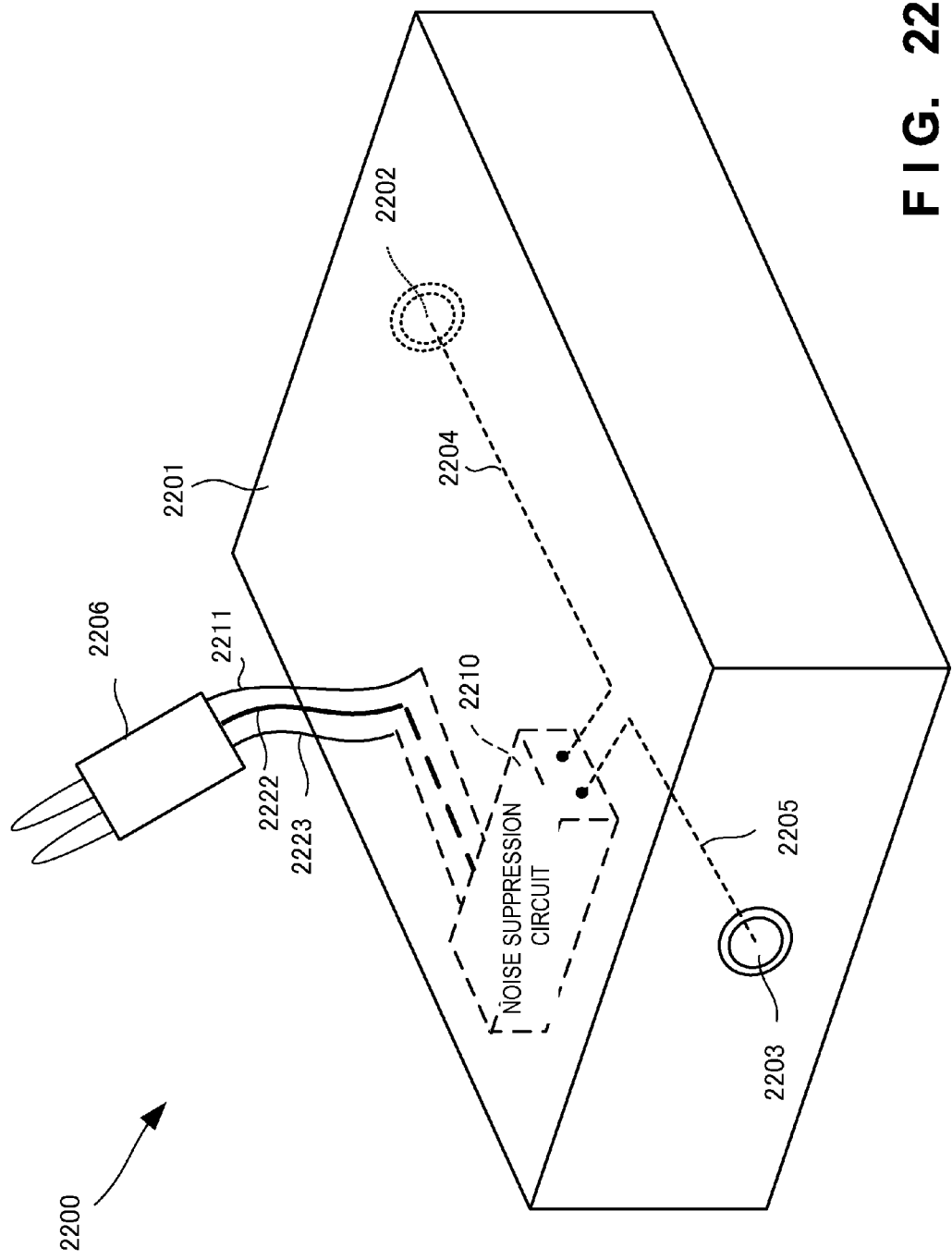
FIG. 22 is a perspective view showing the arrangement of a speech input apparatus according to the ninth embodiment of the present invention.

FIG. 22 is a perspective view showing the arrangement of a speech input apparatus 2200 according to this embodiment. Note that the structure incorporating the noise suppression circuit is not limited to that shown in FIG. 22.

The speech input apparatus 2200 includes a sound insulating block 2201, and a first microphone 2202 and a second microphone 2203 which are integrated with the sound insulating block 2201. Signals from the first microphone 2202 and the second microphone 2203 are guided to a noise suppression circuit 2210 incorporated in the sound insulating block 2201 by wires 2204 and 2205. The noise suppression circuit 2210 suppresses noise based on a mixture signal from the first microphone 2202 and a noise signal from the second microphone 2203, generates an enhanced speech signal, and outputs it from wires 2211 and 2222 via a connector 2206. Note that a wire 2223 is used to supply power.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when a speech processing program for implementing the functions of the embodiments is supplied to the system or apparatus directly or from a remote site. Hence, the present invention also incorporates the speech processing program installed in a computer and executed by the computer to implement the functions of the present invention, a medium storing the speech processing program, and a WWW (World Wide Web) server that causes a user to download a control program. Especially, the present invention incorporates at least a non-transitory computer readable medium.

This application claims the benefit of Japanese Patent Application No. 2013-025000 filed on Feb. 12, 2013, which is hereby incorporated by reference herein in its entirety.

What is claimed is:

1. A speech input apparatus comprising:
a sound insulating block attached to a ceiling member in a vehicle, so that a planer surface of the sound insulating block is attached to the ceiling member and side surfaces of the sound insulation block are projected from the ceiling member;
a first microphone that is out of the sound insulating block and attached to one of the side surfaces of said sound insulating block or attached to the ceiling member in a vicinity of said sound insulating block, on a side close to a passenger of the vehicle, inputs a first sound mixture including a voice of the passenger and noise in the vehicle and outputs a first signal to a noise suppressor;
a second microphone that is out of the sound insulating block and attached to another of the side surfaces of said sound insulating block or attached to the ceiling member in the vicinity of said sound insulating block, on a side far from the passenger, inputs a second sound mixture including a voice of the passenger and noise in the vehicle and outputs a second signal to the noise suppressor; and
a first mechanism capable of retracting said sound insulating block to be stored in or above the ceiling member, so that said sound insulating block insulates propagation of sound between the first microphone and the second microphone when said sound insulating block is projected from the ceiling member, and said sound insulating block does not insulate the propagation of sound between the first microphone and the second microphone when said sound insulating block is stored in or above the ceiling member.

2. The speech input apparatus according to claim 1, wherein said sound insulating block is attached in a predetermined range of the ceiling member in which said sound insulating block does not separate the noise in the vehicle while insulating the voice of the passenger.

3. The speech input apparatus according to claim 1, wherein said sound insulating block has a triangular surface covering the ceiling member, said first microphone is arranged on a side of a base, and said second microphone is arranged on a side of an apex.

4. The speech input apparatus according to claim 1, wherein a vertical sectional shape of said sound insulating block is a right angled triangle whose one side other than a hypotenuse is located on the side of the ceiling member, said first microphone is arranged on the side of the hypotenuse, and said second microphone is arranged on another side other than the hypotenuse.

5. The speech input apparatus according to claim 1, further comprising a first driver that operates said first mechanism based on a first control signal.

6. The speech input apparatus according to claim 5, wherein said first driver operates said first mechanism based on the first control signal generated based on information including one of a vehicle speed, an engine or motor speed, noise of an air conditioner, an operation of a windshield wiper, an operation of a blinker, an operation of an audio system, an operation of a car navigation system, and an operation of a hazard lamp.

7. The speech input apparatus according to claim 1, further comprising a second mechanism capable of rotating said sound insulating block about an axis that makes a right angle with respect to a lower surface of the ceiling member.

8. The speech input apparatus according to claim 7, further comprising a second driver that operates said second mechanism based on a second control signal.

9. The speech input apparatus according to claim 8, wherein said second driver operates said second mechanism based on the second control signal generated based on information including one of a piece of speech, a speech input direction, a seat weight sensor, and an instruction from a user.

10. The speech input apparatus according to claim 1, wherein a plurality of first microphones are arranged around or on side surfaces of said sound insulating block, and further comprising a switch that switches said plurality of first microphones corresponding to said second microphone.

11. The speech input apparatus according to claim 1, further comprising:
  a plurality of speech input sets, each including said sound insulating block, said first microphone and said second microphone, at least one speech input set being provided for each seat; and
  a selector that selects one of said plurality of speech input sets.

12. The speech input apparatus according to claim 11, wherein said selector selects one of said plurality of speech input sets based on a third control signal generated based on information including one of a speech analysis result, a detection result of a seat weight sensor and an instruction from a user.

13. A speech processing method comprising:
  by a first mechanism capable of retracting a sound insulating block to be stored in or above a ceiling member in a vehicle, so that said sound insulating block insulates propagation of sound between a first microphone and a second microphone when said sound insulating block is projected from the ceiling member, and said sound insulating block does not insulate the propagation of sound between the first microphone and the second microphone when said sound insulating block is stored in or above the ceiling member, projecting the sound insulating block or retracting the sound insulating block;
  by the first microphone that is out of the sound insulating block and provided on one of side surfaces of the sound insulating block attached to the ceiling member in the vehicle, so that a planer surface of the sound insulating block is attached to the ceiling member and the side surfaces of the sound insulation block are projected from the ceiling member, or provided on the ceiling member in a vicinity of the sound insulating block, on a side close to a passenger of the vehicle, inputting a first sound mixture including a voice of the passenger and noise in the vehicle and outputting a first signal to a noise suppressor;
  by a second microphone that is out of the sound insulating block and provided on anther of the side surfaces of the sound insulating block or provided on the ceiling member in the vicinity of the sound insulating block, on a side far from the passenger, inputting a second sound mixture including a voice of the passenger and noise in the vehicle and outputting a second signal to the noise suppressor; and
  by the noise suppressor, suppressing the noise based on the first signal and the second signal and outputting an enhanced speech signal.

14. A non-transitory computer readable medium storing a speech processing program for causing a computer to execute a method comprising:
  causing a first mechanism capable of retracting a sound insulating block to be stored in or above a ceiling member in a vehicle, so that said sound insulating block insulates propagation of sound between a first microphone and a second microphone when said sound insulating block is projected from the ceiling member, and said sound insulating block does not insulate the propagation of sound between the first microphone and the second microphone when said sound insulating block is stored in or above the ceiling member, to project the sound insulating block or retract the sound insulating block;
  causing a first microphone that is out of the sound insulating block and provided on one of side surfaces of the sound insulating block attached to the ceiling member in the vehicle, so that a planer surface of the sound insulating block is attached to the ceiling member and the side surfaces of the sound insulation block are projected from the ceiling member, or provided on the ceiling member in a vicinity of the sound insulating block, on a side close to a passenger of the vehicle, to input a first sound mixture including a voice of the passenger and noise in the vehicle and output a first signal to a noise suppressor;
  causing a second microphone that is out of the sound insulating block and provided on another of the side surfaces of the sound insulating block or provided on the ceiling member in the vicinity of the sound insulating block, on a side far from the passenger, to input a second sound mixture including a voice of the passenger and noise in the vehicle and output a second signal to the noise suppressor; and causing the noise suppressor to suppress the noise based on the first signal and the second signal and output an enhanced speech signal.

15. A ceiling member comprising a speech input apparatus of claim 1.

16. A vehicle comprising a speech input apparatus of claim 1.

\* \* \* \* \*